July 8, 1930.  G. C. LEPPLA  1,770,079
VOLUME RECORDER AND REGISTER
Filed Sept. 10, 1925   15 Sheets-Sheet 1
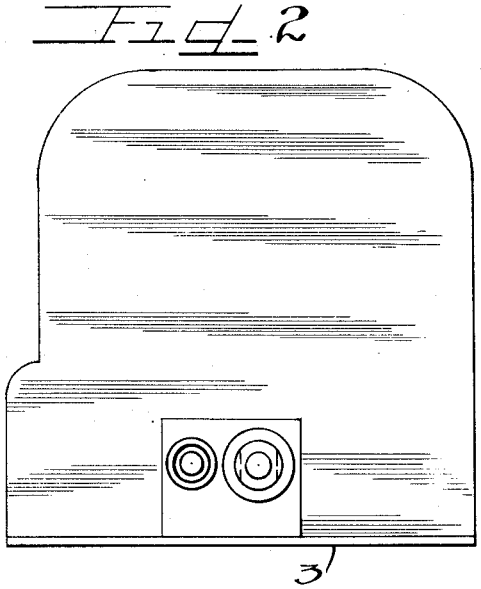
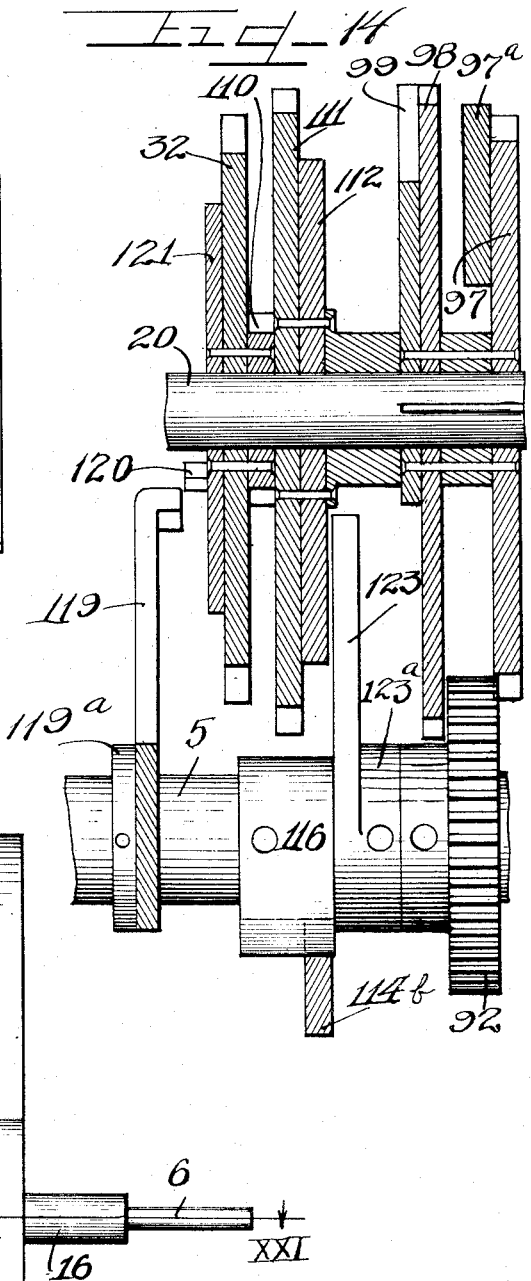
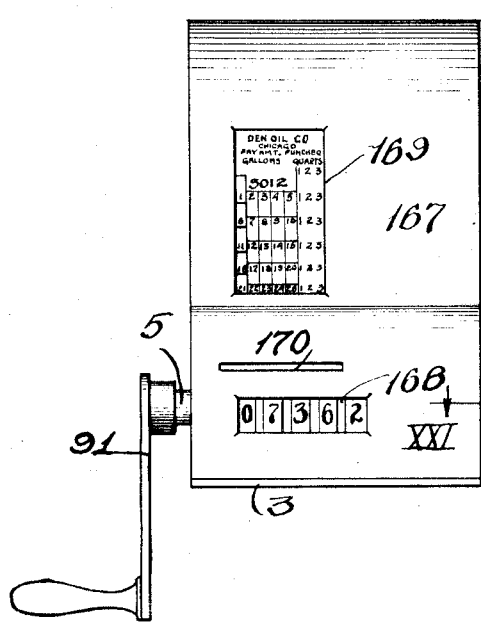
Inventor
George C. Leppla
by Charles Miller
Attys.

July 8, 1930.                G. C. LEPPLA                1,770,079
                      VOLUME RECORDER AND REGISTER
                 Filed Sept. 10, 1925    15 Sheets-Sheet 2

Fig. 3

Inventor
George C. Leppla
by Charles... Attys

July 8, 1930.  G. C. LEPPLA  1,770,079
VOLUME RECORDER AND REGISTER
Filed Sept. 10, 1925   15 Sheets-Sheet 3

Inventor
George C. Leppla
by Charles Hill
Attys.

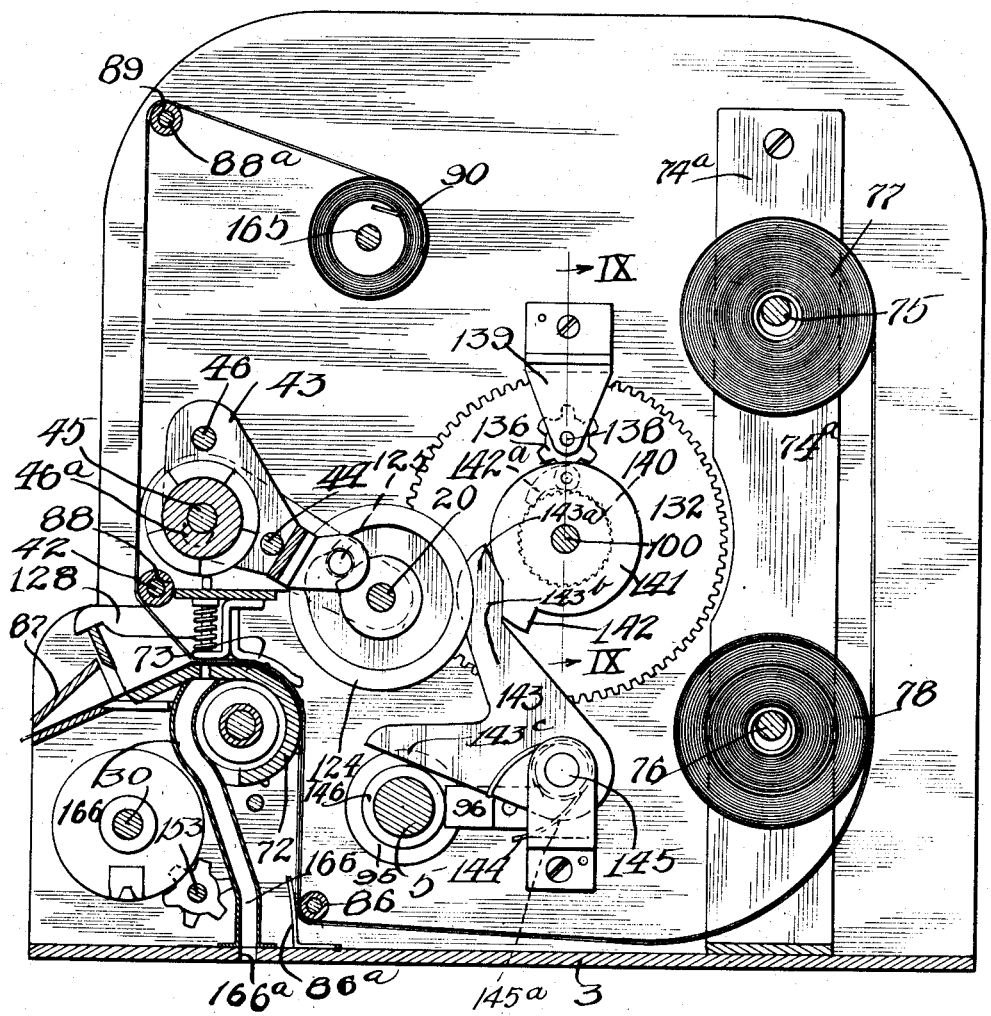

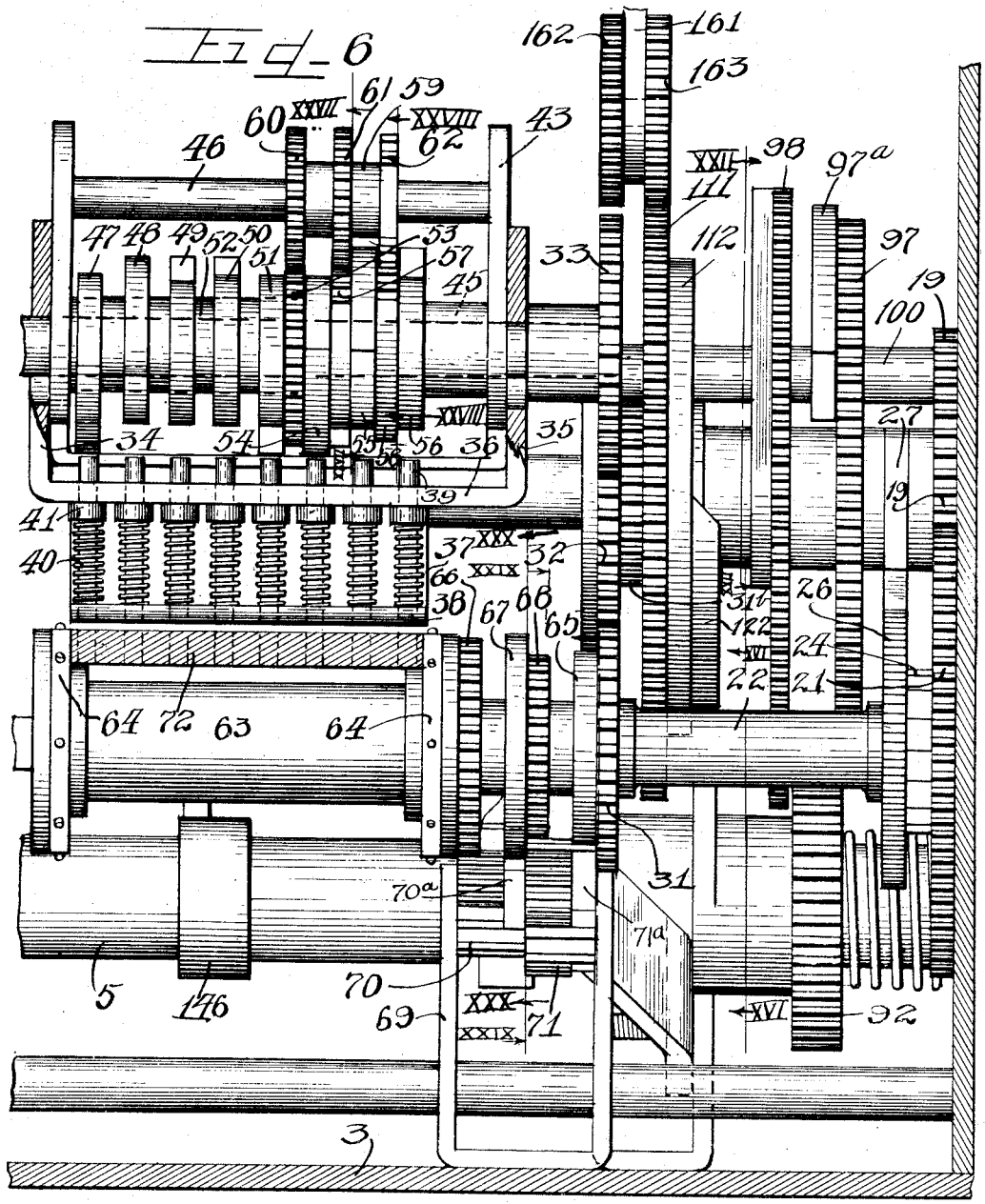

July 8, 1930.  G. C. LEPPLA  1,770,079
VOLUME RECORDER AND REGISTER
Filed Sept. 10, 1925   15 Sheets-Sheet 6
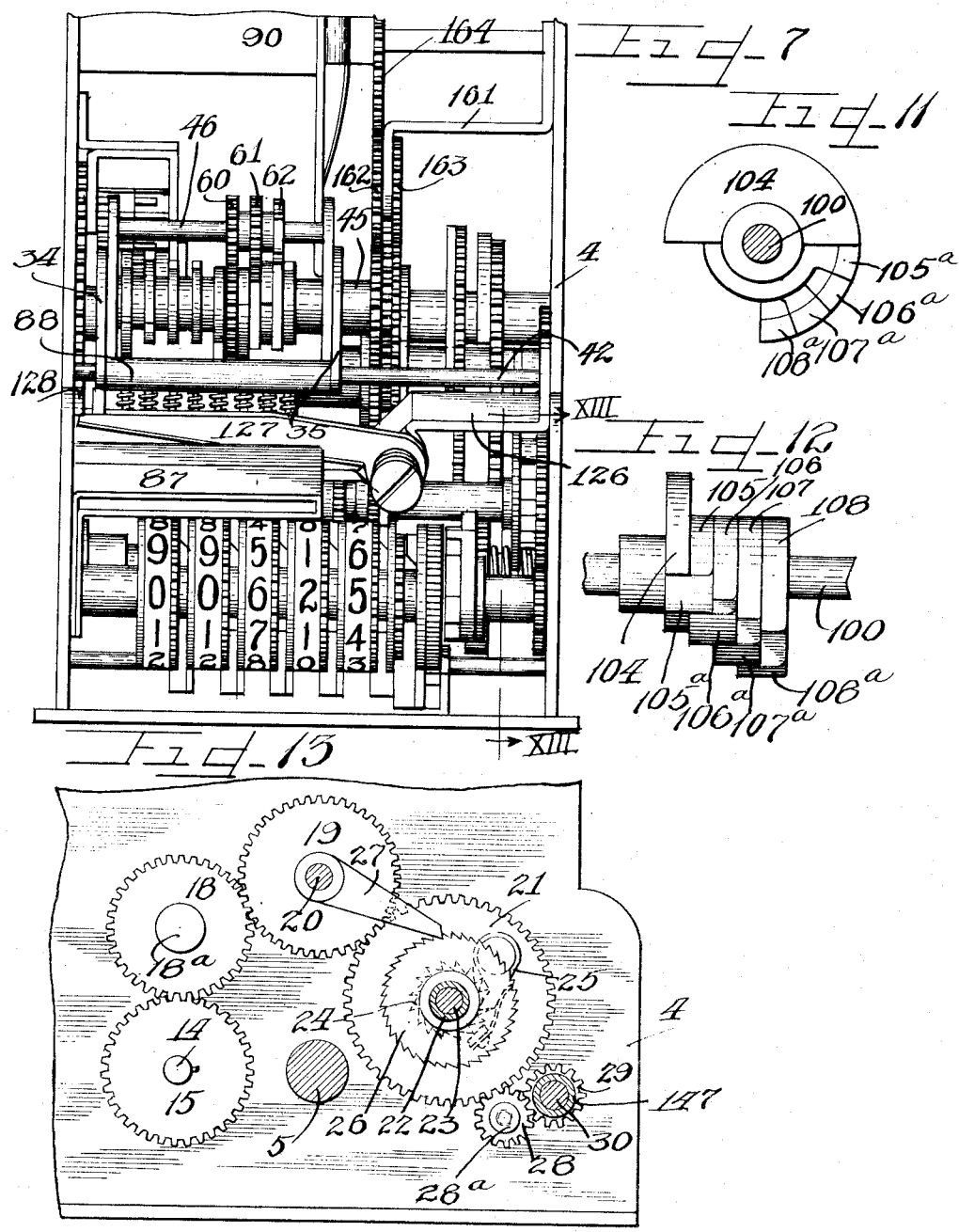

July 8, 1930.  G. C. LEPPLA  1,770,079
VOLUME RECORDER AND REGISTER
Filed Sept. 10, 1925   15 Sheets-Sheet 7
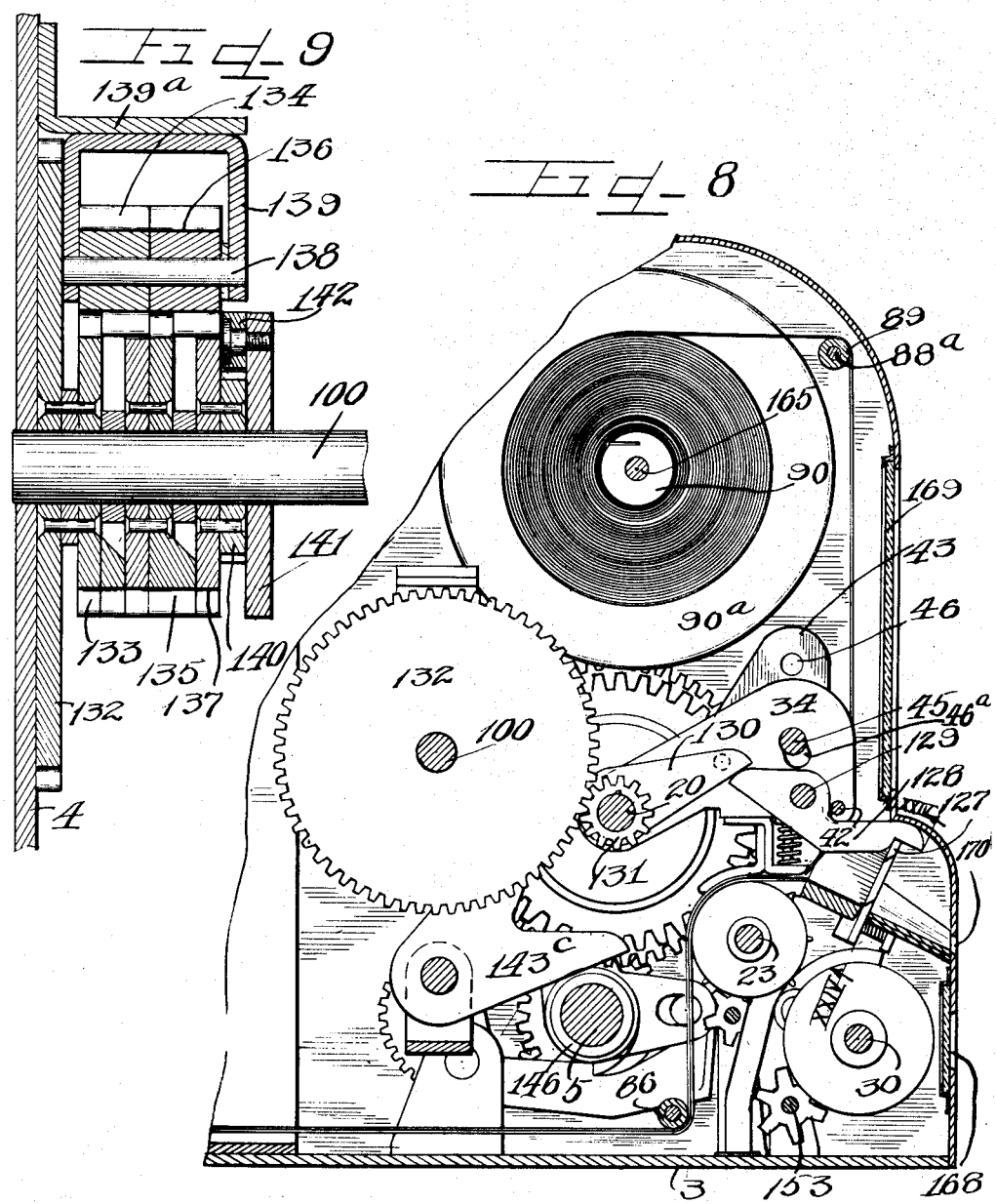
Inventor
George C. Leppla
by Charles... Atty̧s

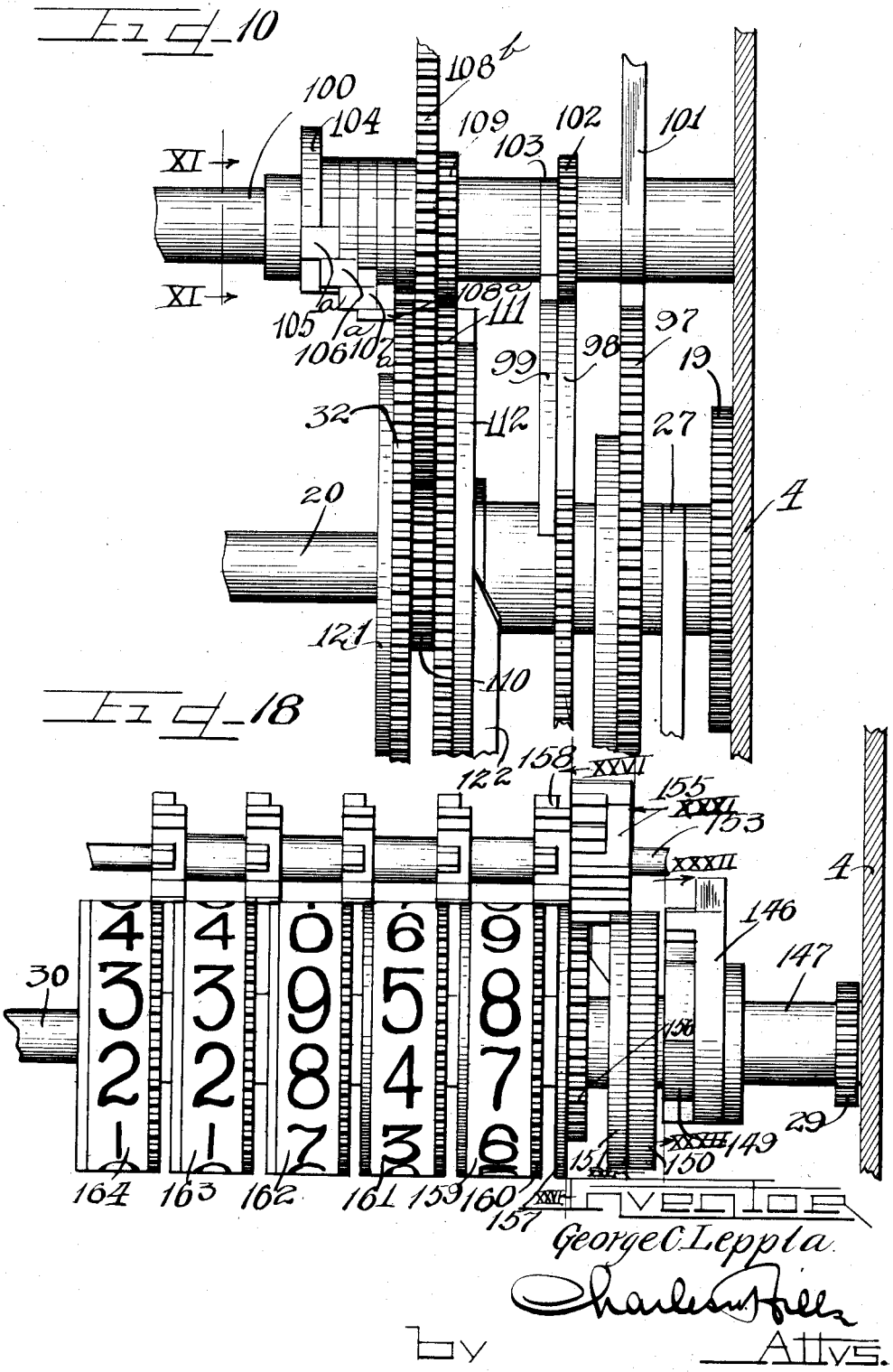

July 8, 1930. G. C. LEPPLA 1,770,079
VOLUME RECORDER AND REGISTER
Filed Sept. 10, 1925 15 Sheets-Sheet 9
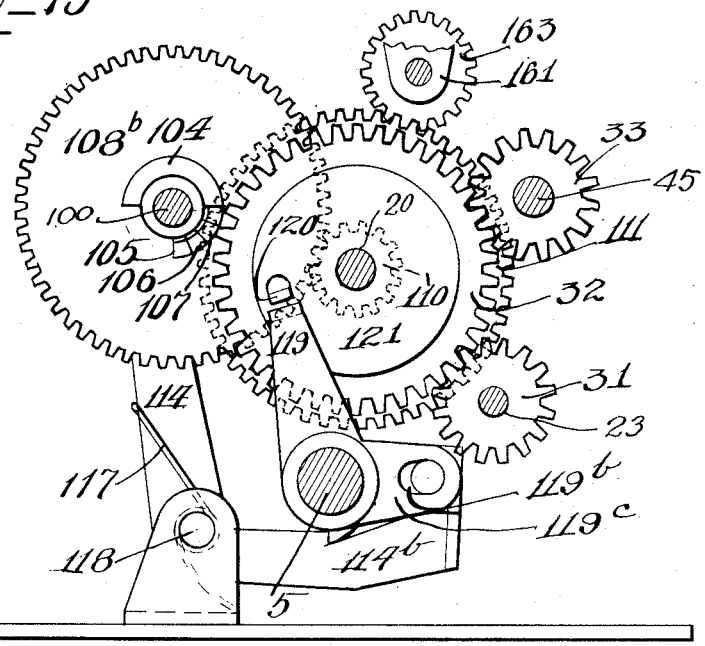
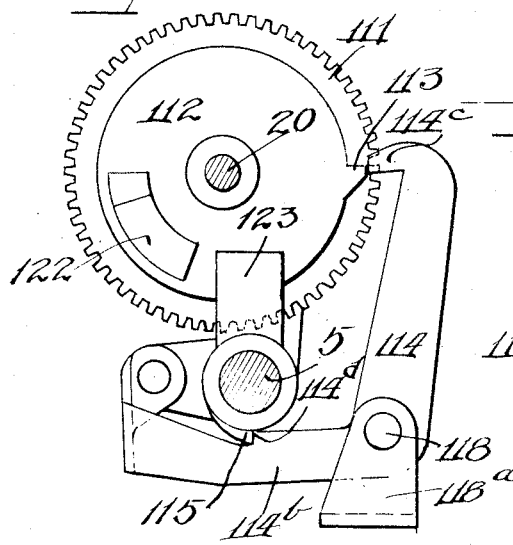
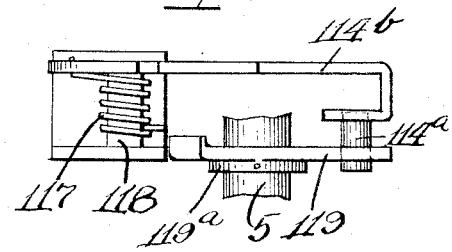
Inventor
George C. Leppla.
by Charles... Attys.

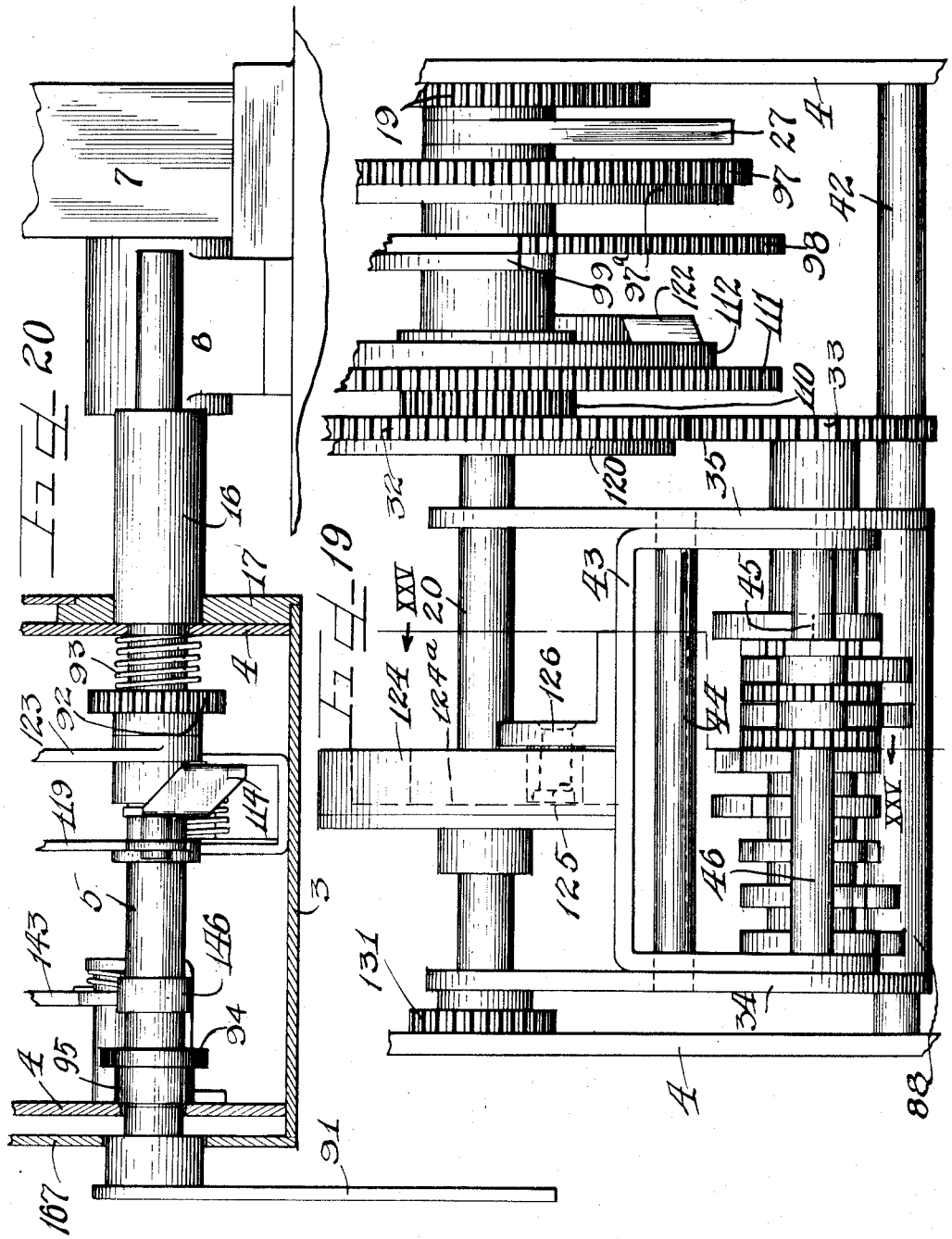

July 8, 1930. G. C. LEPPLA 1,770,079
VOLUME RECORDER AND REGISTER
Filed Sept. 10, 1925 15 Sheets-Sheet 11
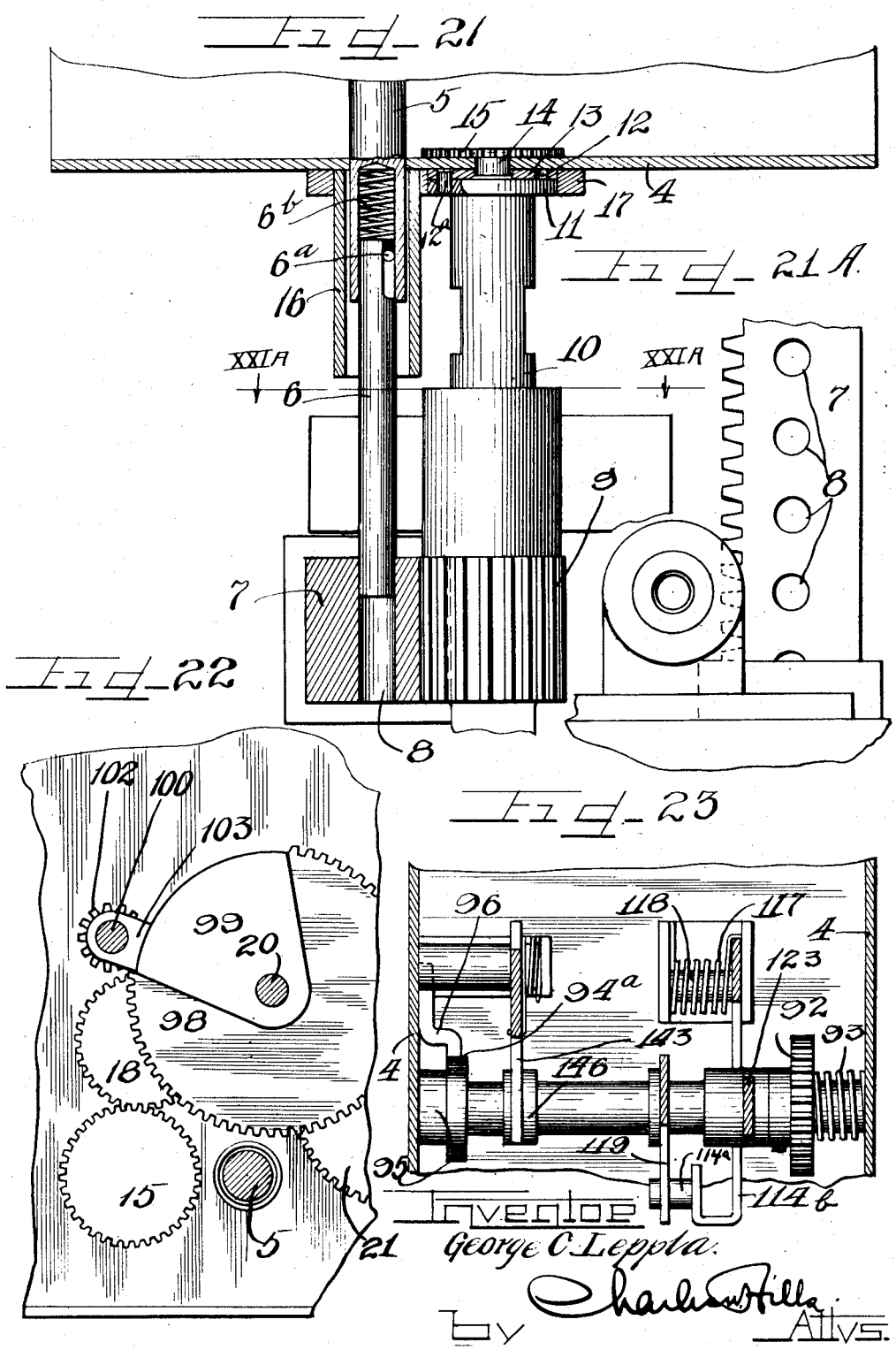

July 8, 1930.                G. C. LEPPLA                1,770,079
                    VOLUME RECORDER AND REGISTER
                  Filed Sept. 10, 1925      15 Sheets-Sheet 12
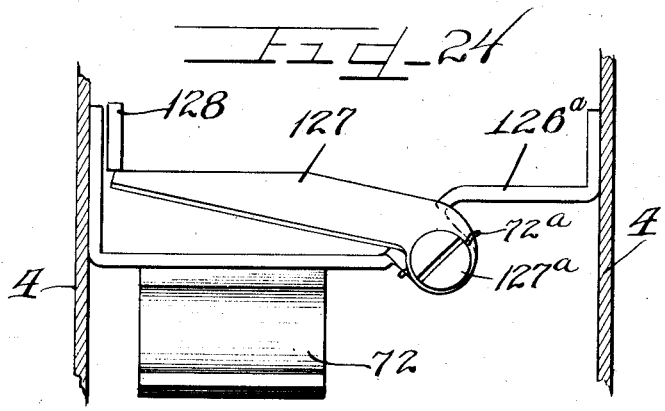
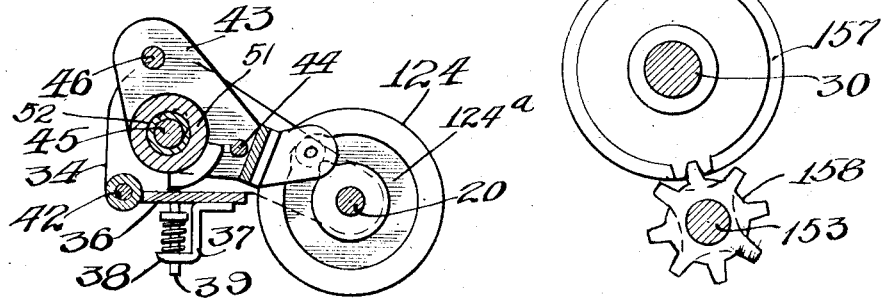
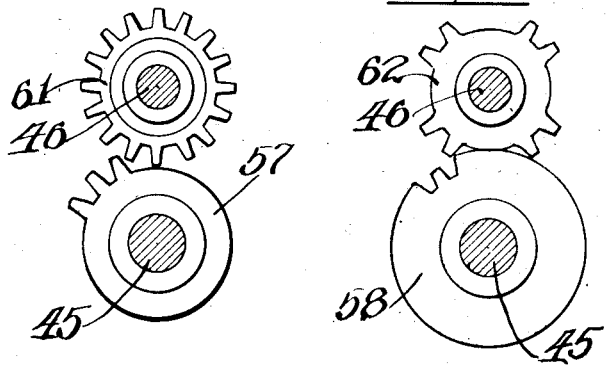
Inventor
George C. Leppla
by Charles... Attys.

July 8, 1930.  G. C. LEPPLA  1,770,079
VOLUME RECORDER AND REGISTER
Filed Sept. 10, 1925  15 Sheets-Sheet 13

Inventor
George C. Leppla
by Charles W. Hills
Attys

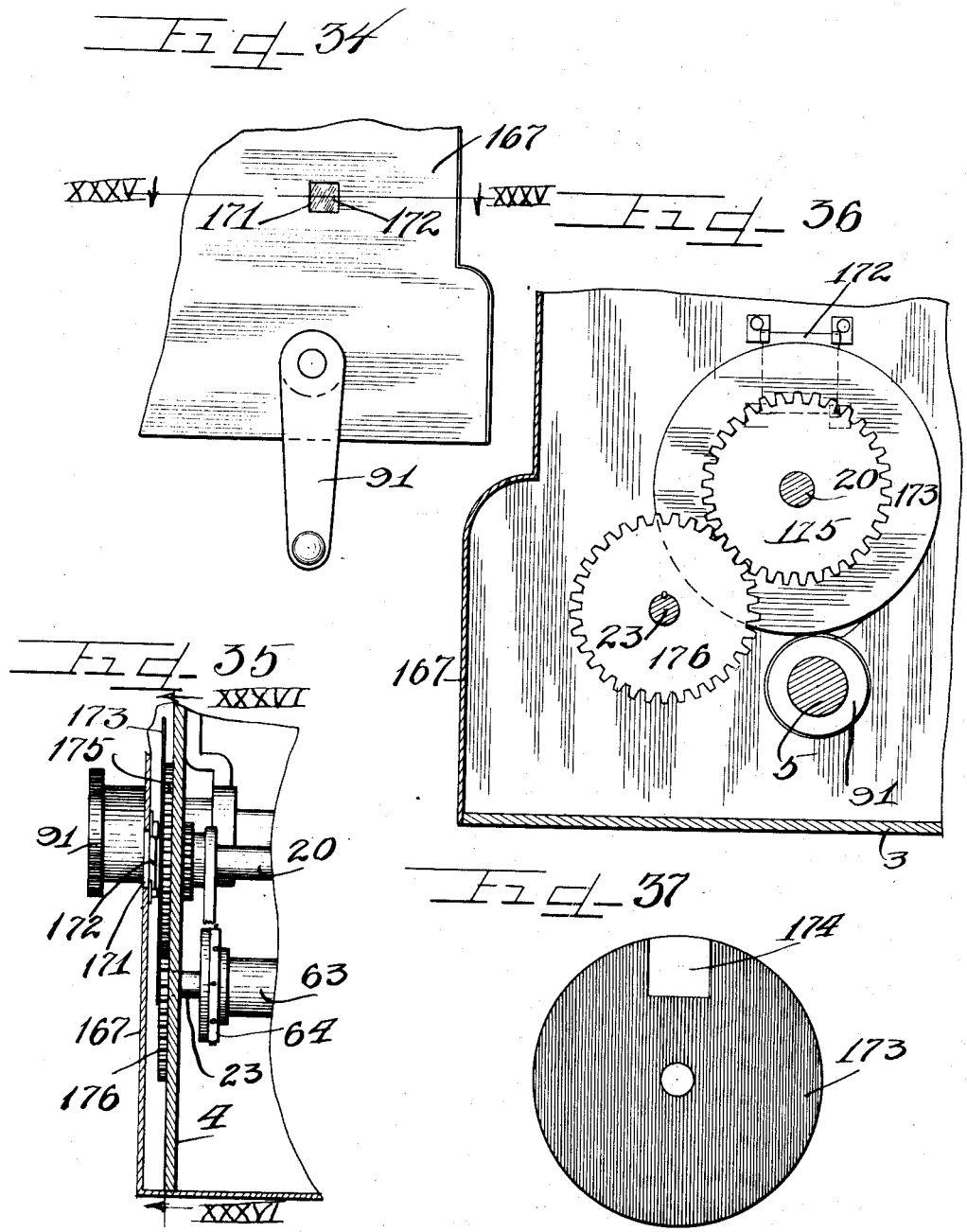

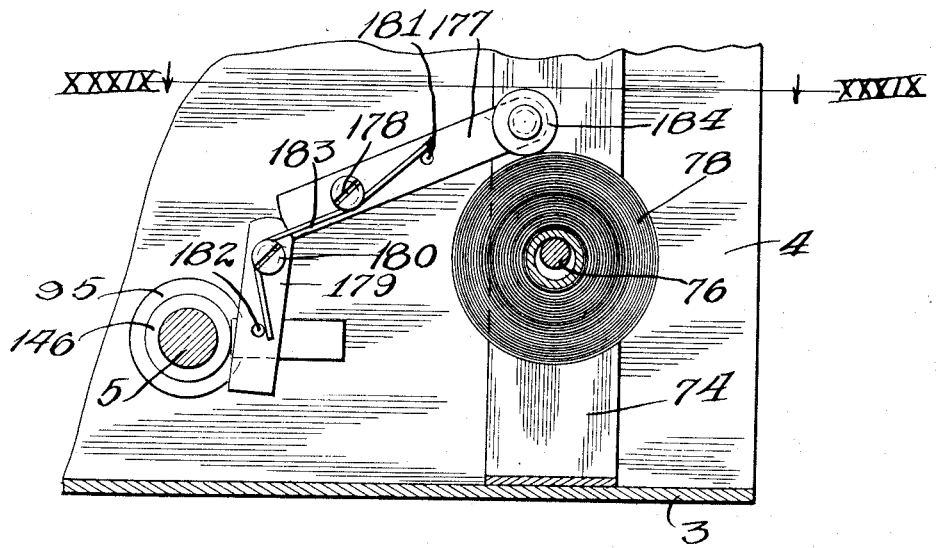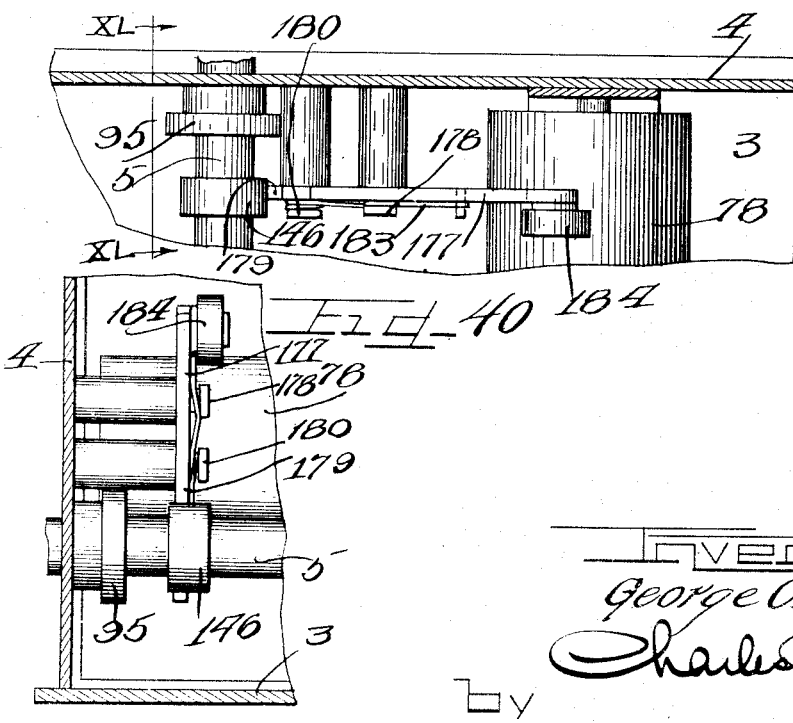

Patented July 8, 1930

1,770,079

UNITED STATES PATENT OFFICE

GEORGE C. LEPPLA, OF CHICAGO, ILLINOIS, ASSIGNOR TO JOHNSON FARE BOX COMPANY, OF CHICAGO, ILLINOIS, A CORPORATION OF NEW YORK

VOLUME RECORDER AND REGISTER

Application filed September 10, 1925. Serial No. 55,425.

This invention relates to a volume register and recorder for use on a machine for measuring and vending liquids or other materials.

It is among the objects of this invention to provide a novel and improved attachment that may be incorporated in new gasoline pumps or the like or that may be applied to existing pumps, that is adapted to punch and deliver a small ticket of constant size though a large amount may have been dispensed, that will record the amount dispensed in view of the customer, that will register the total amount dispensed thereby; that will indicate whether a ticket has been properly issued, that is accurate in its operation and limited to dispensing a predetermined quantity and provided with safeguards to secure accurate operation.

With the above and other objects in view as will be apparent, this invention consists in the construction, combination and arrangement of parts hereinafter more fully described, claimed and is illustrated in its preferred form in the accompanying drawings.

On the drawings:

Figure 1 is a front elevational view of a device embodying this invention.

Figure 2 is a side view of the same.

Figure 3 is an enlarged plan view of the device with the cover removed.

Figure 5 is a detail vertical section along the line V—V of Figure 3 showing in addition the ticket and record rolls.

Figure 6 is an enlarged fragmentary vertical section, with parts in elevation, along the line VI—VI of Figure 3.

Figure 7 is a detail fragmentary front elevation of Figure 3 with parts removed.

Figure 8 is a fragmentary detail section with parts omitted taken at the line VIII—VIII of Figure 3 showing in addition the ticket duplicate roll.

Figure 9 is a detail fragmentary section with parts omitted taken at the line IX—IX of Figure 5.

Figure 10 is a fragmentary enlarged plan view with parts omitted of shafts 20 and 100 and mechanism thereon.

Figure 11 is a detail section with parts omitted taken at the line XI—XI of Figure 10.

Figure 12 is a front elevation of Figure 11 showing the parts in zero position.

Figure 13 is a detail fragmentary section taken along the line XIII—XIII of Figure 7 with parts omitted.

Figure 14 is an enlarged fragmentary detail section taken along the line XIV—XIV of Figure 4 with parts omitted.

Figure 15 is a detail fragmentary section taken along the line XV—XV of Figure 3 with parts omitted.

Figure 16 is a reduced detail view with parts omitted taken at the line XVI—XVI on Figure 6.

Figure 17 is a detail fragmentary plan view of a portion of Figure 15.

Figure 18 is an enlarged detail fragmentary view of the register mechanism as viewed in Figure 7.

Figure 19 is an enlarged detail front elevational view of the punch mechanism with parts removed as viewed in Figure 3.

Figure 20 is a detail vertical section of the auxiliary shaft taken at the line XX—XX of Figure 3 with parts in elevation.

Figure 21 is an enlarged fragmentary detail horizontal section at the line XXI—XXI of Figure 1, showing the manner in which the device is connected with a liquid pump.

Figure 21$^a$ is a fragmentary detail vertical view of the pump mechanism taken at the line XXIA—XXIA of Figure 21 with parts omitted.

Figure 22 is an enlarged fragmentary detail vertical section taken at the line XXII—XXII of Figure 6 with parts omitted.

Figure 4:
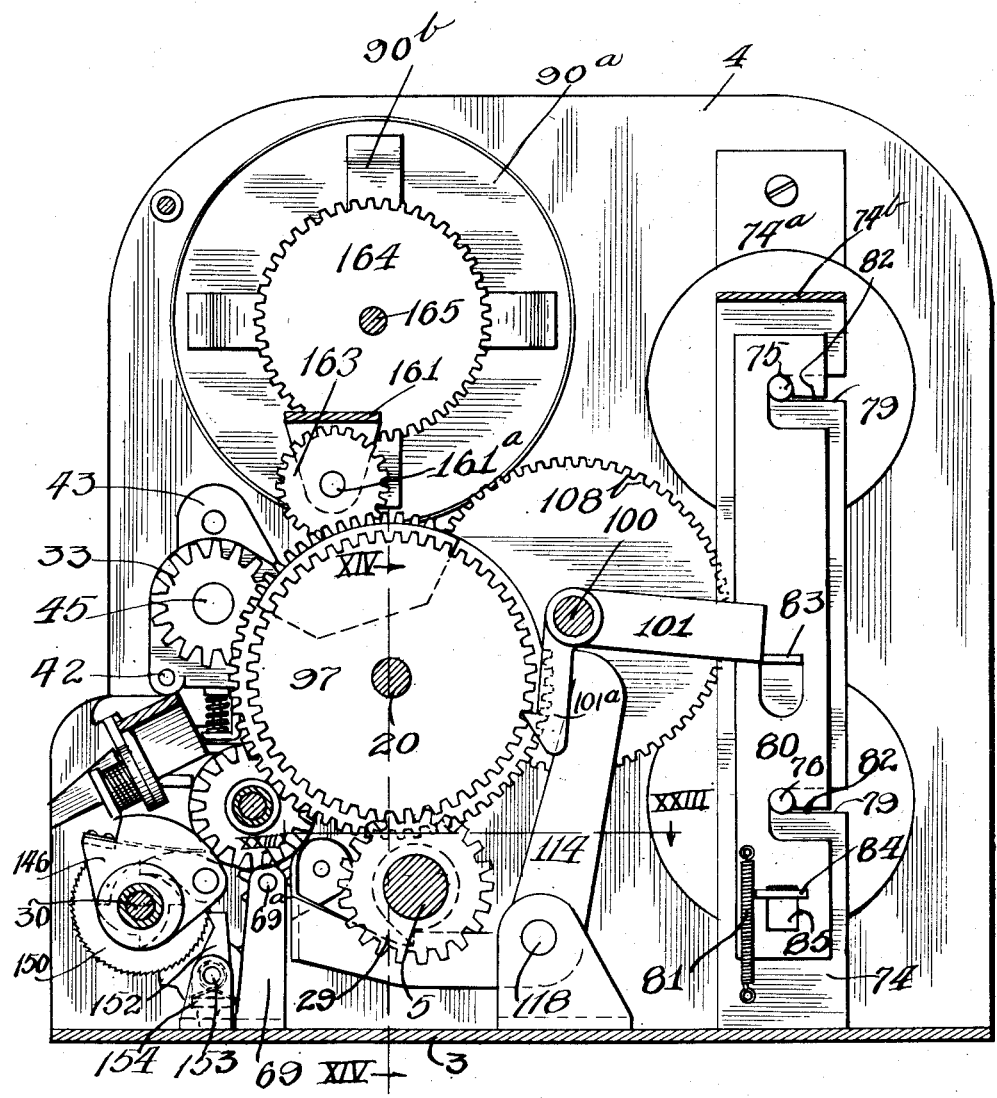
Figure 4 is a vertical section along the line IV—IV of Figure 3.

Figure 23 is an enlarged fragmentary detail horizontal section taken at the line XXIII—XXIII of Figure 4 with parts omitted.

Figure 24 is an enlarged fragmentary sectional view of the ticket cutter as viewed at the section XXIV—XXIV in Figure 8 with parts removed.

Figure 25 is a reduced detail vertical sectional view of the punch mechanism taken along the line XXV—XXV of Figure 19 with parts omitted.

Figure 26 is an enlarged detail sectional view of one of the cyclometer gearings taken along the line XXVI—XXVI of Figure 18 with parts omitted.

Figure 27 is an enlarged detail sectional view of a Geneva gearing for the punch index mechanism taken along the line XXVII—XXVII of Figure 6 with parts omitted.

Figure 28 is a detail vertical sectional view of a Geneva gearing for the punch index mechanism taken along the line XXVIII—XXVIII of Figure 6.

Figure 29:
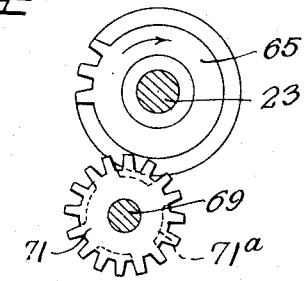

Figure 29 is a detail vertical sectional view of a Geneva gearing for the cyclometer taken along the line XXIX—XXIX of Figure 6.

Figure 30:
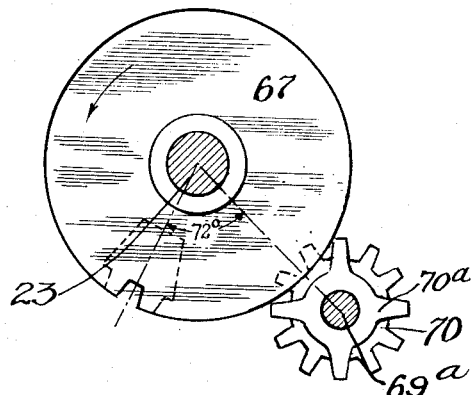

Figure 30 is a detail vertical section taken along the line XXX—XXX of Figure 6. The figure is shown rotated slightly to the right to clear Fig. 30.

Figure 31:
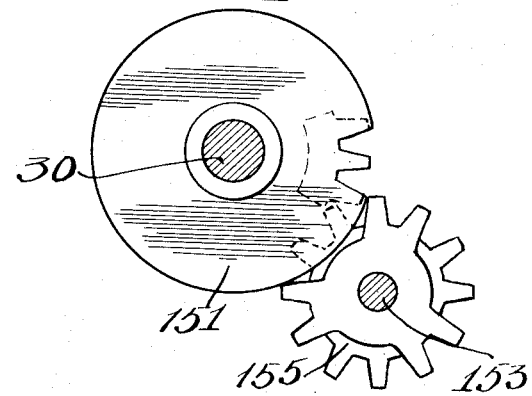

Figure 31 is a detail vertical section taken along the line XXXI—XXXI of Figure 18.

Figure 32:
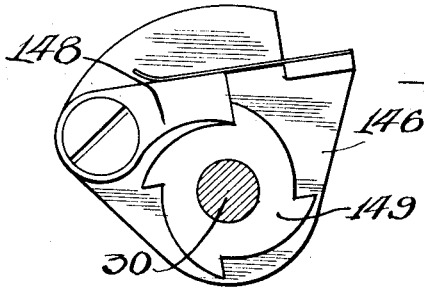

Figure 32 is a detail vertical section taken along the line XXXII—XXXII of Figure 18.

Figure 33:
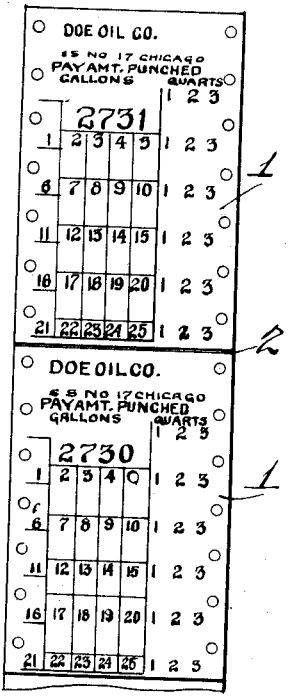

Figure 33 is a plan view showing a portion of the ticket strip.

Figure 34 is a fragmentary elevational detail view of the casing with parts removed showing the means for indicating whether or not a ticket has been issued in accordance with last amount dispensed.

Figure 35 is an enlarged fragmentary detail section at the line XXXV—XXXV of Figure 34 with parts removed.

Figure 36 is a fragmentary detail section taken at the line XXXVI—XXXVI of Figure 35 with parts removed.

Figure 37 is an enlarged detail elevational view with parts removed of the indicator disk shown in Figures 34 to 36 inclusive.

Figure 38 is a fragmentary detail elevational section taken similarly to Figure 5 with parts removed, showing a modified form of the mechanism for preventing operation of the dispenser after a predetermined number of tickets have been issued.

Figure 39 is a fragmentary detail section taken at the line XXXIX—XXXIX of Figure 38.

Figure 40 is a fragmentary detail section taken at the line XL—XL of Figure 39.

As shown in the drawings:

It is desirable in devices of this class to issue a comparatively small ticket of standard length. Heretofore tickets have been used which contain much non-essential data, these usually vary in length with the amount of liquid dispensed. As shown in Figure 33 the ticket strips are printed or marked to comprise a series of consecutively marked tickets 1 which upon issue are severed along the line 2 regardless of the amount of liquid dispensed. The tickets 1 are provided with transversely numbered spaces for the gallons, the spaces being five to a line in a vertical column and numbered from left to right. The left hand spaces e. g. 1 gallon, 6 gallon spaces etc., are stepped up, as shown, for a reason that will be hereinafter apparent. To the right of the column adjacent each line of gallon spaces is provided a space for indicating the number of quarts or fraction of a gallon dispensed. This space is also numbered from left to right. If the ticket is punched in one of the gallon spaces it indicates the number of gallons dispensed. In Figure 33 if the ticket shown were punched not only in the five gallon space but also in the quart space under the numeral three it would indicate that five gallons and three quarts had been dispensed. It is obvious that in order to issue such a ticket that a mechanism must be provided to position the punch from left to right in accordance with the liquid dispensed and that to prevent the punch when six gallons have been dispensed from punching in the one gallon space, that a mechanism must be provided for shifting the ticket at predetermined intervals in accordance with the quantity of liquid dispensed. The mechanism provided for positioning the punching mechanism from left to right in accordance with the liquid dispensed will hereinafter be referred to as the punch index mechanism. The mechanism for shifting the ticket at predetermined intervals in accordance with the liquid dispensed will be hereinafter referred to as the ticket step up mechanism.

The device comprises a base 3 upon which is rigidly secured a pair of upwardly extending side plates 4 between which is mounted the various mechanisms. The device is adapted to be operatively connected with a liquid pump as shown in Figure 21. A shaft 5 mounted between the side plates 4 extends therefrom and is recessed at its outer end for receiving an axially aligned smaller shaft 6 therein which is normally sprung outward against a stop $6^a$ by a spring $6^b$. A racked plunger rod 7 of a liquid pump is adapted to be moved vertically adjacent the shaft 6 in accordance with the amount of liquid dispensed. The plunger rod 7 has a plurality of vertically arranged transverse apertures 8 therein which are aligned with the shaft 6 and are adapted to receive the same when opposite thereto and the latter is actuated longitudinally by the shaft 5 as will be hereinafter described. If the solid portion of the rack bar 7 between the apertures 8 happens to be opposite the shaft 6 when the shaft 5 is actuated longitudinally, the spring $6^b$ will be compressed against the shaft 6 and energy stored up thereby will project the end of the shaft 6 into the appropriate aperture when movement of the rack bar brings an aperture into register. The driving pinion 9 of the pump meshes with the rack bar 7 and drives an axially aligned shaft 10 with which the pinion is rigidly connected. A circular flange 11 is rigidly secured on the inner end of shaft 10 and apertured to receive a pin 12ª secured in one of a pair of diametrical apertures 12 in a circular plate 13. The plate 13 is rigidly secured on a shaft 14 the latter axially aligned with the shaft 10 and journalled in the plate 4. The diametrical apertures 12 are provided for adjusting the drive as near as possible to accommodate for slight variations in pump strokes but this is in addition to the automatic means for accommodating for variations in lengths of stroke which will be described hereinafter. Inside the plate 4 rigidly secured to the shaft 14 is a gear 15. A guard sleeve 16 surrounds the outer end of the shaft 5. A plate 17 rigidly secured on the plate 4 supports the sleeve 16 and provides a guide for the flange 11 and plate 13.

*The mechanism for driving the punch index and the ticket step up mechanism*

This mechanism includes the gear 15, connections before described to the rack bar 7, and the mechanism shown in Figure 13. A gear 18 loosely mounted on a stud 18ª secured to the plate 4 above and meshing with the gear 15 drives a gear 19 loosely mounted on a shaft 20 rotatably secured between the plates 4. The gear 19 meshes with a larger gear 21 loosely mounted on a sleeve 22 coaxial with a shaft 23 journalled on the plates 4. A ratchet 24 shown in dotted lines in Figure 13 is rigidly secured to the sleeve 22 and is engaged by a spring pressed pawl 25 on the gear 21 for enabling said sleeve 22 to be driven by the gear 21 when the same is driven in a clockwise direction (as viewed in Figure 13). A larger ratchet wheel 26 also rigidly secured to the sleeve 22 is engaged by a gravity pawl 27 loosely mounted on the shaft 20 for preventing counter clockwise movement of said sleeve 22 during reversal of the pump. A pinion 28 loosely mounted on a stud 28ª on the plate 4 engages with the gear 21 and is adapted to drive a gear 29 on the cyclometer sleeve 147 which is coaxial with a shaft 30 as will be described hereinafter. Turning to Figure 6, a gear 31 will be seen rigidly secured on the sleeve 22 which drives a larger gear 32 loosely mounted on the shaft 20. The gear 31 comprises a part of the ticket step up mechanism which will be hereinafter described. The larger gear 32 drives a smaller gear 33 of the punch index mechanism which will now be described.

*The punches and punch index mechanism*

Rigidly supported within the casing are a pair of brackets 34 and 35 which are shown in Figure 6 as being connected by a horizontal transverse plate 36. Supported on and beneath the plate 36 is a laterally extending bar 37 which has a forwardly bent flange 38 thereon apertured to receive the lower ends of a plurality of quantity recording members or punches 39 each provided near its upper end with a collar 41. Springs 40 surround the punches 39 and act to hold the same upwardly so that collars 41 thereon abut the underside of the plate 36. The plate 36 is apertured to permit the upper ends of the punches 39 to extend therethrough and thereabove. The forward portions of the brackets 34 and 35 are supported on a transverse bar 42 extending between the plates 4, the rearward portions of said brackets being mounted on the shaft 20. By reference to Figures 6 and 19 there will be seen a punch index carriage 43 pivotally mounted within the brackets 34 and 35 on a pivot shaft 44 secured between said brackets. The carriage 43 has journalled therein a punch index driving shaft 45 extending above the punches 39, and has a parallel shaft 46 extending above said shaft 45 and secured in the sides of the carriage 43. The shaft 45 extends outwardly of the carriage 43 through the brackets 34 and 35 and has rigidly secured on the right hand outwardly extending portion thereof the driving gear 33.

The brackets 34 and 35 are provided with substantially vertical slotted apertures 46ª (see also Figure 8) to receive the outwardly extending portions of the shaft 45 and to permit vertical movement of said shaft therein when the carriage 43 is tilted about its pivot shaft 44 as will be hereinafter described in connection with the punch actuating mechanism.

The shaft 45 has mounted thereon five index members, 47, 48, 49, 50 and 51 which are rigidly mounted on a sleeve 52 which is driven by a gear 53 also secured on said sleeve at the right thereof. The index members above mentioned are adapted to separately actuate the five left hand punches 39 corresponding thereto when the carriage 43 is tilted. Each index member 47, 48, 49, 50 and 51 presents one fifth of the periphery of a circle, the rest of the periphery being cut away adjacent the edge thereof. Said index members are arranged from one end at successive angular increments apart of substantially 72° so that the periphery of one is always in position to engage one of the corresponding punches 39 beneath them. When the periphery of index member 47 has been moved out of engaging position with the corresponding punch beneath said member, the periphery of index member 48 will have moved into engaging position with the punch beneath it and so on from left to right. Mounted on the shaft 45 in corresponding relation with the three right hand punches 39 and to the right of sleeve 52 are three additional index members 54, 55 and 56. Each of the latter three index members presents one fourth of the periphery of a circle, the rest of the periphery being cut away adjacent the edge thereof. The three index members 54, 55 and 56 are arranged from one end at successive angular increments apart of substantially 90° leaving a gap of 90° between the ends thereof. Mounted on the shaft 45 between the left and the middle of said three index members is a three tooth segment gear 57 (Figures 6 and 27) and a single tooth gear 58 (Figure 28) between the middle and the right of said index members. The gear 58 has the root circle raised to the height of the single tooth except immediately on either side of said tooth. The central tooth of the gear 57 is in axial alignment with the single tooth of gear 58. Index members 54, 55 and 56 are thus arranged so that when member 54 is in engaging position above its punch 39, member 55 will not be in position for engaging its respective punch 39 until member 54 has moved off by the rotation of shaft 45. When member 55 has moved out of engaging position with its punch 39, member 56 will have moved into position for engaging its punch 39. Since each of said index members presents one fourth of the periphery of a circle there will be a remaining one fourth or ninety degrees of rotation of the shaft 45 which will not bring one of these three members into punching position. These three index members are for indexing the quarts dispensed. The previously described five index members 47, 48, 49, 50 and 51 are for indexing the gallons. The three index members 54, 55 and 56 with the gears 57 and 58 are all rigidly secured to the shaft 45 and are rotatable therewith. Rigidly secured on a sleeve 59 rotatable on the shaft 46 is a gear 60; a similar gear 61 driven by the three tooth gear 57, and a Geneva gear 62 engaging with the single tooth gear 58 to lock the shaft 46 from carrying over when driven by said gear 57. Each rotation of shaft 45 dispenses a gallon and each rotation of the three toothed gear 57 thereon will actuate gear 61 one quarter of a revolution. A quarter of a revolution of gear 61 will thru gear 60 impart one fifth of a revolution to the sleeve 52, the gear 53 and 60 having such a ratio. After each quarter revolution of disk 58, it will be locked by the Geneva gear lock 62 as shown in Figure 28.

*The ticket step up mechanism*

In Figure 6 is shown the sleeve 22, the gear 31 thereon driven as previously described. Loosely mounted on the shaft 23 is a barrel 63 which has secured thereto at either end sprocket wheels 64. The teeth of these sprocket wheels engage in holes in both sides of the ticket and the recording strips for driving the same. Secured to the gear 31 is a three tooth segment 65 (see also Figure 29).

Secured to the right hand sprocket 64 is a gear 66. Loosely mounted between gear 66 and segment 65, is a two tooth segment 67 (see also Figure 30) and a gear 68, rigidly secured thereto. Loosely mounted on a transverse shaft 69ᵃ (Figure 4) supported by a bracket 69 secured to the bottom plate 3, are gears 70 and 71 each of which is provided with a locking Geneva gear 70ᵃ and 71ᵃ respectively at one end (Figures 6, 29 and 30). Gear 71 is driven by the segment 65 (Figure 29) and in turn drives the gear 68 with the segment 67 attached thereto; segment 67 drives the gear 70 (Figure 30) which in turn drives the gear 66 secured to the sprockets 64. During one complete cycle of operation, that is the issue of one ticket, the sprockets 64 and gear 66 are designed to make seven eighths of one revolution. The ratio of the driving gears is such that one rotation of the gear 31 represents one gallon dispensed. When gear 31 has been rotated three quarters of a revolution from initial position, that is when three quarts have been dispensed, gear 70 will step gear 66 and the sprockets 64 one initial step advancing the ticket one-half a space. Thereafter the gear 70 will step the gear 66 two steps for every five gallons dispensed each series of two steps occurring at regular intervals of five gallons but each step of each series occurring intermittently within the five gallons. When one more gallon is dispensed that is when a total of one gallon and three quarts have been dispensed, the first step of the first series will occur. After four more gallons have been dispensed making a total of five gallons and three quarts, the second step of the first series will occur. The steps will continue at the intermittent intervals of one step for one gallon, another step for four more gallons, repeating the series and making two such steps for every five gallons thereafter dispensed. The first five gallon interval, not the first five gallons dispensed, is taken from three quarts to five gallons and three quarts, the initial step mentioned above for the first three quarts really belonging to the previous interval which began before the machine arrived at initial position and stopped. This operation arises from the fact that when disk 65 initially operates pinion 71, the teeth on disk 67 are a lag of substantially 72° from engagement with pinion 70. The disk 65 during each rotation, rotates pinion 71 one quarter of a revolution, and one quarter of a revolution of pinion 71 will rotate disk 67 one fifth of a revolution, due to the ratio of gears 71 and 68. Accordingly the initial actuation of pinion 71 by disk 65 which will occur when about 3 quarts have been pumped will rotate disk 67 so that the same will actuate pinion 70 substantially the distance of one and a half teeth, and impart a fractional rotation to the sprockets. After another revolution of gear 31, when substantially one and three fourths gallons have been pumped pinion 71 will be advanced another quarter of a revolution and the pinion 70 will be advanced the remainder of the distance or in other words, the remaining one and one half teeth, thereby rotating the sprocket a second fractional distance. Before pinion 71 can be actuated again, it will be necessary for gear 31 to make four revolutions thereby pumping four more gallons of gasoline. In positioning the disk 67 a lag of about 72° behind disk 65, it will always require two actuations of pinion 71 to move the teeth of disk 67 past pinion 70. The gallon index member 51 is in punching position as well as the three quart index member when only three quarts have been dispensed but since the ticket (Figure 33) is printed with the first three quart spaces in line above the gallon spaces, the punch caused by the member 51 can be ignored or the space above the five gallon space may be designated as a zero gallon space. The left hand gallon column on the ticket comprising the spaces for 1, 6, 11, etc. gallons is printed somewhat higher than the adjacent columns and the two intermittent steps in each five gallon interval is given by the ticket step up mechanism because of the difficulty in indexing for instance six gallons and simultaneously withdrawing the index members from above the five gallon and the three quart spaces the very instant that six gallons have been dispensed. In other words the foregoing provides a means for indexing any one of the gallon spaces in the left hand column and simultaneously removing the index members from operating position above their respective preceding gallon and quart spaces.

A guide member 72 having a vertically extending semi-cylindrical portion, a flat horizontal portion joining said first portion at its upper edge on its concave side, and a downwardly sloping portion joining said horizontal portion is provided for supporting and guiding the ticket record strips. The guide member 72 is secured beneath a transverse bracket 126ª (Figure 24) secured to the side plates 4 and extends between the sprockets 64, the semi-cylindrical portion being coaxial with said sprockets. The horizontal portion of the guide 72 is provided with a plurality of die apertures registering with the respective punches 39. An upper semi-cylindrical laterally extending guide 73 Fig. 5 properly spaced from the guide 72 and secured to the bar 37 is also provided for assisting in guiding therebetween the ticket and record strip.

As shown in Figures 4 and 5, a vertical transverse frame having the outer vertical element 74ª secured against one of the side plates 4 and the inner vertical element 74 bent horizontally and laterally at the upper end thereof is provided, said upper horizontal portion 74ᵇ extending and secured to the opposite plate side 4. Said elements 74—74ª of said frame have mounted therein upper and lower horizontal shafts 75 and 76 for supporting the ticket roll 77 and the recording roll 78 respectively. The inner vertical element 74 is provided with two horizontal slots 79 extending inwardly from the rearward edge as shown in Figure 4, so that the shafts 75 and 76 may be inserted and removed. A slidable vertical bar 80 normally pressed in downward position by a spring 81 connected thereto and to the element 74 is provided with two horizontal bayonet slots 82, one for each shaft. When the bar 80 is in normal downward position, the shafts 75 and 76 are held in the frame in the bayonet slots. When said bar 80 is moved upwardly against the tension of said spring 81, the shafts 75 and 76 may be inserted or removed. The bar 80 is held in operative relation against the inner face of the element 74 by means of a T-headed lug 84 struck inwardly from said element and which extends through a suitable slot 85 in the bar 80 permitting vertical movement of said bar sufficiently to engage or release the shaft.

The strips from both rolls 77 and 78 are similarly marked and provided with corresponding serial numbers and indicia, are led downwardly, brought together, led forwardly and beneath a laterally extending guide roller 86 mounted between the side plates 4 and having a spring 86ª frictionally engaging the forward periphery thereof and secured at its bottom end to the base 3. The ticket and record strips then lead upwardly and between the guides 72 and 73 and engage over the sprockets 64. The strip from the roll 77 is to be issued in the form of individual tickets and the record strip is retained within the machine for record purposes. The tickets are issued through a laterally extending issuing chute 87 (Figures 5 and 7) which has flat upper and lower sides converging to the discharge orifice or slot 170 in the casing (Figure 1). The record strip from the roll 78 is drawn upward over a guide sleeve 88 on the shaft 42 extending between brackets 34 and 35, thence over a second sleeve 89 on a shaft 88ª secured between the side plates 4 and then wound on a roll 90 to provide a duplicate of all the issued tickets. The shaft 88ª is parallel to the shaft 42 and vertically spaced therefrom a distance in excess of the length of a ticket for the purpose of displaying the duplicate just issued through a view window 169 in the casing. The roll 90 is provided with a transverse aperture extending inwardly from the periphery thereof for securing the end of the record strip thereto and is rigidly secured on a shaft 165 journalled between the plates 4. Secured on the shaft 165 inwardly of the roll 90 is a guard disk 90ª (Figure 3) which is abutted against the end of said roll by a radially extending spring 90ᵇ, the latter being abutted by the hub of a gear 164 rigidly secured to said shaft. The shaft 165 through the gear 164 is driven by the pump mechanism and the resetting mechanism as will be hereinafter described.

*The punch actuating, resetting, and ticket severing mechanisms*

On the outer left end of the shaft 5 as viewed in Figure 1 there is provided an auxiliary handle 91. By referring to Figures 20 and 23 it will be seen that a gear 92 is provided rigidly secured to the shaft 5. A spring 93 surrounding the shaft 5 and coaxial therewith abuts the side plate 4 and the gear 92 for holding the shaft 5 to the left causing a collar 94 at the left of said shaft to abut a washer 95 surrounding said shaft and secured to the left hand side plate 4. The collar 94 is provided with a radially extending slot 94ᵃ in the periphery thereof to receive therein a detent 96 secured to the side plate 4, extending outwardly therefrom, and then bent into said slot. The detent 96 holds shaft 5 against rotatable movement when the latter is in initial position as shown in said Figures 20 and 23. The handle 91 and shaft 5 may be moved to the right releasing the collar 94 from the detent 96 to permit rotation of said handle and shaft. As soon as the latter is rotated, the slot 94ᵃ in collar 94 will be moved out of alignment with the detent preventing the shaft 5 from moving to the left until said slot and detent are again in register. When shaft 5 and handle 91 are in normal locked position, the small shaft 6 connected to said shaft 5 is not in position for engaging the rack bar of the pump but when said handle 91 and shaft 5 are moved to the right for permitting rotation thereof, the small shaft 6 is axially pressed against the rack bar of the pump and locks the same as soon as one of the apertures 7 therein comes in register with said shaft 6 so that no further liquid can be dispensed.

As shown in Figures 6, 10 and 14, rigidly secured on the shaft 20 adjacent the pawl 27 is a large gear 97 which is adapted to mesh with the gear 92 when the latter is moved to the right. Said gear 97 has provided thereon adjacent the periphery thereof an arcuate sector plate 97ᵃ which is adapted to abut the left side of the teeth of gear 92 throughout a portion of the rotation of said gear 97 to prevent the shaft 5 and the gear 92 thereon returning to the left when the slot 94ᵃ in the collar 94 is again in register with the detent 96 until a complete cycle (one revolution of gear 97) is obtained. The ratio of the teeth of gear 92 to the teeth of gear 97 is as 1 to 2. The gear 97 on the shaft 20 is mounted adjacent a large mutilated gear 98 and is rotatively secured thereto. As shown more particularly in Figure 22 the gear 98 has its teeth cut away throughout a portion of its circumference and adjacent such portion it is provided with a sector-like plate 99 which is secured to the side of said gear and is substantially co-extensive with said portion. Adjacent the shaft 20 and parallel thereto is journalled in the side plates 4 a rotatable shaft 100 which has mounted thereon a gravity pawl 101, shown more particularly in Figure 4. The pawl 101 has a rearwardly extending weighted portion and a depending detent 101ᵃ which engages the teeth of the gear 97 preventing its operation except in one direction. A pinion 102 (Figure 10) is rigidly secured on the shaft 100. The pinion 102 and shaft 100 are adapted to be driven by gear 98. Adjacent the pinion 102 on the shaft 100 is rigidly secured an arcuate dog 103 (see also Figure 22) the arcuate portion of which is concave and is adapted to ride on the sector 99 for preventing rotation of said shaft when the cut away portion of gear 98 is passing beneath the pinion 102. The purpose of preventing rotation of the shaft 100 during the first portion of the rotation of mutilated gear 98 and shaft 20 will be hereinafter explained in connection with the punch actuating mechanism.

As shown in Figures 11, 12 and 10, rigidly secured on the shaft 100 is a dog 104, the periphery of which as shown but not necessarily presents one-half of a circle the rest of the periphery being cut away adjacent the edge thereof. Loosely mounted adjacent the dog 104 and to the right thereof in order are plate members 105, 106, 107, 108, and gear 108ᵇ secured to the latter plate 108. The plates 105 to 108 inclusive are circular and similar and are each provided with a finger (105ᵃ to 108ᵃ inclusive) extending parallel to the axis on the left thereof. Adjacent the gear 108ᵇ and secured thereto is a pinion 109, the latter fitting loosely on the shaft 100. To the right of the gear 32 and secured thereto on the shaft 20 is mounted a pinion 110 loosely fitting said shaft. The pinion 110 meshes with the gear 108ᵇ.

The gear 108ᵇ rigidly secured to the plate 108 when driven by pinion 110 and the pump mechanism, rotates its plate away from the finger 107ᵃ. If rotated sufficiently, finger 108ᵃ will abut finger 107ᵃ on the other side thereof, and both the fingers 108ᵃ and 107ᵃ will thereupon move together away from finger 106 until the finger 107ᵃ abuts the finger 106ᵃ when the latter will be picked up. The three fingers 108ᵃ, 107ᵃ and 106ᵃ will then rotate together and may eventually, if driven far enough by gear 108ᵇ, pick up in order finger 105ᵃ and dog 104. The dog 104 and fingers 105ᵃ to 108ᵃ inclusive thus provide a lost motion whereby the amount which dog 104 and shaft 100 must be rotated before the latter is able to rotate gear 108ᵇ depends upon the previous rotation of said gear 108ᵇ in the opposite direction by pinion 110 driven by the pump mechanism.

The pinion 109 loose on the shaft 100 and rigidly secured to the gear 108ᵇ meshes with a gear 111 loosely mounted on the shaft 20. A circular plate 112 is rigidly secured to the gear 111 on its right side, shown more particularly in Figure 16.

Mechanism is provided for locking the auxiliary handle shaft 5 at the end of one cycle of operation and the issue of the ticket until at least two quarts of liquid has been dispensed during the next cycle of operation. This mechanism comprises as shown in Figure 15 and 16 a collar 116 rigidly secured on the shaft 5 and having a tooth 115 thereon projecting from the periphery thereof and adapted to be in its downward position at the beginning and end of each cycle of operation. A bell crank lever having an upwardly extending arm 114 and a substantially horizontal arm 114ᵇ is pivoted on a small shaft 118 supported in a bracket 118ᵃ secured to the base 3. A cam projection 113 on the periphery of plate 112 acts with the rotation of said gear 111 to abut an inwardly extending projection 114ᶜ on the upper end of the arm 114, and acts to hold the latter in outer position to raise the arm 114ᵇ and cause a locking detent 114ᵈ on the latter to be engaged by the tooth 115 to arrest shaft 5. Surrounding the shaft 118 is a spring 117 which acts to hold the projection 114ᶜ against the periphery of plate 112. The cam projection 113 will not ride past the projection 114ᶜ to release the tooth 115 from engagement with the detent 114ᵈ until the pump mechanism has driven the gear 111 from initial position a distance corresponding to at least two quarts of liquid dispensed. When the cycle of operation has been completed, that is when gear 111 has been driven one complete revolution, the cam projection 113 will again engage the projection 114ᶜ for again locking the shaft 5.

Means are provided for preventing overthrow of the mechanisms at the end of a cycle of operations. As shown more particularly in Figure 17, this means comprises the horizontal arm 114ᵇ which is bent sidewardly at the outer end thereof and then rearwardly, the rearwardly bent portion having a pin 114ᵃ secured therein and extending therefrom parallel to shaft 5. The pin 114ᵃ engages in a horizontal slot 119ᵇ (Figure 15) in a substantially horizontal arm 119ᶜ of another bell crank lever which has an upwardly extending arm 119 and is rotatively mounted on shaft 5. The upwardly extending arm 119 is bent horzontally at the upper end thereof toward the arm 114 to form a projection. When the arm 114 is in the outward position shown in Figure 16, the arm 119 is held in the position shown in Figures 14 and 15 with the projection on the latter arm positioned to the left and beneath a lug 120 carried by the gear 32, as shown this lug is struck from a circular plate 121 concentric with and rigidly secured on the gear 32. When the shaft 5 is moved to the right as viewed in Figure 14 and the auxiliary handle is rotated to effect the punching, resetting and ticket severing operations, as will be hereinafter described, a collar 119ᵃ secured on said shaft 5 to the left of the arm 119 will cause said arm to move to the right for the lug 120 to engage therewith when it has completed its cycle (one revolution) thus preventing any overthrow of said various mechanisms. The plate 112 makes one revolution for every ticket issued and is driven partly by the pump mechanism and partly by the auxiliary handle through the lost motion mechanism.

Means are provided for automatically locking the rack bar of the pump when twenty-five gallons, the capacity of one ticket, has been dispensed. This means comprises a laterally extending arcuate cam 122 secured on the side of the plate 112 adjacent the periphery thereof for engaging an upwardly extending member 123 integral with a collar 123ᵃ rigidly secured on the shaft 5 for automatically forcing the shaft 5 to the left and locking the rack bar of the pump near the end of each rotation of the gear 111 from initial position.

The resetting of the machine, that is the returning of the index members and the ticket step up mechanism to initial positions, consists in driving the same forwardly by the auxiliary handle after the pump mechanism has stopped until they have completed the incomplete cycle of operation. A complete cycle of operations is the advance of the ticket index and step up mechanisms from initial position at the beginning of the indicating spaces on one ticket until they reach initial position again at the beginning of the indicating spaces on the following ticket. The ticket is provided with a heading containing printed matter which covers substantially two-sevenths of the length of the ticket. The remaining portion of the ticket below the heading is printed with gallon and quart spaces to provide for a maximum dispensation of twenty-five gallons for each ticket issued. In order to effect the advance of the ticket through two-sevenths of its length or through the space covered by the heading so as to bring the initial gallon and quart spaces on said ticket adjacent the punches at the beginning of each cycle of operations, additional movement is given to the various mechanisms for feeding the strip. Consequently the ticket step up and ticket index mechanisms are advanced through one complete cycle a distance which if they were driven entirely by the pump mechanism would correspond to the dispensation of thirty-five gallons. But the pump mechanism cannot drive the various mechanisms through more than a distance corresponding to twenty-five gallons because of the cam 122 automatically engaging the member 123 for locking the pump. The handle 91 must then be actuated to drive the various mechanisms through the remaining distance to the end of the cycle. The heading on the ticket might be omitted and then the above additional movement would be unnecessary. The resetting mechanism takes effect where the pump mechanism left off in the cycle of operation. This is accomplished by the lost motion connection between the shaft 100 and the gear 108$^b$ comprising the circular plates 104, 105, 106, 107 and 108 with their respective fingers 104$^a$, 105$^a$, 106$^a$, 107$^a$, and 108$^a$ previously described in connection with Figures 10, 11 and 12. The gear 98 driven by the auxiliary handle through gears 92 and 97 may thus drive the shaft 100 for driving the gear 108$^b$ through the lost motion for resetting the mechanisms to initial position. However, as shown in Figure 10 and more particularly in Figure 22, shaft 100 will not be driven until gear 98 on shaft 20 has been rotated through the arc covered by the portion of its periphery in which the teeth have been cut away adjacent the plate 99. This is sufficient to allow the shaft 20 to effect the punching operation before the resetting operation takes place.

To effect the punching operation there is rigidly secured on the shaft 20 a cam 124 which is provided with an annular axially cut cam slot 124$^a$ as shown in Figure 19, and more particularly in Figure 25, in which to track a cylindrical laterally extending horizontal roller 125 secured to a rearwardly extending bracket 126 on the carriage 43. The roller 125 upon rotation of the cam 124 is actuated by the slot therein to tilt the forward end of the carriage 43 downwardly about the shaft 44 to effect the punching operation while the gear 98 is traveling with its toothless sector 99 adjacent the periphery of said gear 98. As soon as the punching operation has been completed and the teeth on gear 102 have begun to drive shaft 100, finger 104$^a$ will begin to engage gear 102 and approach through the medium of the fingers 105$^a$, 106$^a$, etc., the gear 108$^b$. Dog 104 will pick up gear 108$^b$ just where the pump mechanism left off so that when shaft 20 has made one complete revolution, the index and step up mechanisms will have been moved through the entire cycle advancing the ticket from beneath its heading through its entire length and advancing the following ticket through the heading of the latter and in position for the next sale. It will be noted that gear 108$^b$ when connected to shaft 100 thru the lost motion clutch will rotate gear 110 and also gear 32 which is connected to gear 110. Gear 32 operates gear 33 on cam punch shaft 45 for resetting the punches. Gear 32 also operates gear 31 on sleeve 22 for advancing the record and ticket strips thru the gears 71, 66, 67, 70 and 66 as before explained.

To effect the severing of the ticket, mechanism is provided as follows:

A transverse movable cutter blade 127 (Figure 24) is pivoted at its right hand end bracket on a screw 127$^a$ mounted on the transverse bracket 126$^a$ supported between the side plates 4. The cutter 127 is adapted to be impelled downwardly by the forward arm of a lever 128 (see also Figure 8) for severing the ticket strip at the edge of the guide member 72. The cutter 127 is normally pressed upwardly away from the edge of the guide 72 by a spring 72$^a$ surrounding the pivot screw 127$^a$. The lever 128 is also provided with a rear arm shaped somewhat as shown in Figure 8 and is pivoted intermediate its ends on a laterally extending stud 129 secured on the bracket 34. A lever 130 rigidly secured on the shaft 20 is adapted to abut the rear arm of the lever 128 to actuate said lever at the end of the revolution of said shaft 20 for thereby actuating the cutter 127.

*The mechanism for preventing operation of the pump mechanism after a predetermined number of tickets have been issued*

Each roll of tickets may conveniently comprise four hundred tickets and it is desirable when the roll is expended to prevent further operation of the pump, until replacement. Accordingly there is provided rigidly secured on shaft 20 at the left thereof as shown in Figure 8 a pinion 131 which meshes with a larger gear 132 loosely mounted on the left of shaft 100. The ratio of movement of pinion 131 to gear 132 is 5 to 1. The motion of gear 132 is transmitted through two steps of cyclometer gearing comprising gears 133, 134, 135, 136 and 137, the larger gears 133, 135 and 137 being loosely mounted on the shaft 100 inwardly of the gear 132. The smaller gears 134 and 136 are loosely mounted on a short transverse shaft 138 supported in an inverted U-shaped bracket 139 secured to the plate 4 by a flange 139$^a$. Gear 133 on shaft 100 drives small gear 134 on shaft 138. The latter gear drives gear 135 which in turn drives smaller gear 136. The latter gear drives gear 137, the last gear of the Geneva train. Secured to the gear 137 and loose on the shaft 100 is a ratchet 140 which drives a disc 141 through the medium of a pawl 142$^a$ pivoted on the latter and engaging said ratchet. The ratio of the movement of gear 132 to that of gear 135 is as 10 to 1 and the ratio of the movement of the latter gear to that of gear 137 is as 10 to 1 so that the ratio of movement of pinion 131 to disc 141 is as 500 to 1. Since pinion 131 on shaft 20 makes one revolution for every ticket issued, disc 141 will make one revolution for 500 tickets or four fifths of a revolution for 400 tickets, the capacity of each ticket roll. Disc 141 has on the periphery thereof a cam projection 142 (Figure 5). A bell crank lever 143 having an upwardly projecting portion 143ª on an upwardly extending arm 143 thereof is pivoted on a transverse shaft 145 supported in a bracket 145ª secured to one of the side plates 4 and is normally pressed in upward position with said projection engaging the periphery of the disk 141 by means of a spring 144 surrounding said shaft. The cam projection 142 is adapted to abut the projection 143ª once every revolution of the disk 141 for forcing the lever 143 and a lower arm 143° thereon downwardly. When the lever 143 is moved downwardly, the lower arm 143° thereof is adapted to rest upon the collar 146 on the shaft 5. Consequently when the shaft 5 is shifted to the right and causes the locking of the pump rack, the arm 143° will drop down behind the collar 146 and prevent shaft 5 from returning to the left until the ticket roll has been renewed, and the plate 141 and cam 142 thereon have been moved clockwise to clear the projection 143ª of the lever 143. To clear the cam projection 142 from projection 143ª it will necesitate, by reason of the widths of the interengaging portions of said projections, manually moving the plate 141 one-fifth of a revolution so that 400 more revolutions of pinion 131 will move plate 141, the remaining four-fifths of a revolution bringing said projection 142 back into engagement with said projection 143ª.

*The gallon register and mechanism therefor*

The gallon register is mounted on the shaft 30 (Figures 13 and 18). The pinion 29 on the sleeve 147 loosely mounted on the shaft 30 is driven by gear 28 as previously described in connection with Figures 21 and 13. A plate 146 (see also Figure 32) is loosely mounted on the shaft 30 and is rigidly connected to the sleeve 147. As shown in Figures 18 and 32, plate 146 is provided with a spring pressed pawl 148 pivoted near the periphery of said plate. The pawl 148 engages with a ratchet 149 loosely mounted on the shaft 30. The teeth of the ratchet 149 are made comparatively long depending upon the minimum and maximum variations in lengths of the strokes of the various pumps, so as to accommodate for any variations in lengths of said strokes of the different pumps or of the pump from which the drive may be effected. To the left of the ratchet 149 is rigidly secured a larger ratchet 150 loosely fitted on shaft 30. The ratchet 150 is in turn rigidly secured at the left thereof to a three tooth locking segment 151 also loose on shaft 30 and shown more particularly in Figure 31. An upwardly extending forwardly spring pressed pawl 152 (Figure 4) is mounted on a transverse shaft 153 supported in brackets 154 secured to the base 3, and engages with ratchet 150 for preventing the latter from rotating in a reverse direction. The segment 151 is adapted to drive a Geneva gear 155 (Figures 18 and 31) loose on the shaft 153 which gear in turn drives a gear 156 loose on the shaft 30. The gear 156 is rigidly connected to a two tooth segment 157 (see also Figure 26) also loose on shaft 30 and which drives a Geneva gear 158 (Figure 18) loose on shaft 153. The Geneva gear 158 drives a unit counter wheel 159 by means of a gear 160 secured thereto. Each of the other counter wheels five in number are successively connected together as is usual in decimal registers or counters in a similar manner by gearings similar to segment 157, Geneva gear 158 and gear 160.

Journalled intermediate its ends in a depending bracket 161 (Figure 7) secured to the right side plate 4 is a small transverse shaft 161ª (Figure 4). The shaft 161ª has rigidly secured on either end thereof, adjacent opposite sides of said bracket 161, gears 162 and 163 respectively. Gear 163 meshes with gear 111 on the shaft 20. The gear 162 drives the large gear 164 on the shaft 165 (Figure 4) on which the roll 90 previously described is secured. The pump mechanism thus drives the roll 90 in accordance with the operation thereof and the auxiliary handle drives said roll, through the lost motion mechanism from where said pump mechanism leaves off.

A hollow passage or chute 166 (Figure 5) communicating between the punch apertures in the bottom of the guide 72 and transverse aperture 166ª in the base 3 is provided for disposing of the punchings from the tickets.

A casing 167 (Figure 1) removably encloses the device and is provided with a horizontal window 168 for viewing the register, a vertical window 169 for viewing the duplicate of the ticket which has just been issued as said duplicate passes upward to be wound on roll 90, and a horizontal slot 170 opposite the mouth 87 of the mechanism for allowing the issued ticket to be ejected therethrough.

*Indicating mechanism for indicating whether or not a ticket has been issued in accordance with the last amount dispensed*

Referring to Figure 34 the casing 167 is shown apertured at 171 and provided with a glass pane 172 for displaying the surface adjacent the edge of a disk 173 (Figure 36). The disk 173 is loosely mounted on shaft 20 and as shown in Figure 37 is colored except at a portion 174 adjacent the periphery thereof. The portion 174 is just of sufficient area to cover the aperture 171 and is adapted to register therewith when the device is in initial position just after a ticket has been issued. The disk 173 has a loosely mounted gear 175 secured thereto, the latter being driven by a gear 176 rigidly secured on shaft 23. The ratio of the gears 175 and 176 being such that for seven-eighths of a revolution of gear 176, gear 175 will make one revolution. The shaft 23 makes seven-eighths of a revolution for each complete cycle of operations and is adapted to be driven a portion of a revolution by the dispenser and the remainder of the seven-eighths revolution through the handle 91 so that after a ticket has been issued the gear 175 and disk 173 will have made one revolution and the portion 174 will show through the aperture 171. Consequently after the dispenser has been actuated any amount and before the handle 91 has been actuated to complete the cycle and issue a ticket, the colored portion of the disk 173 will show. Thus the operator or anyone else can readily tell whether a ticket has been issued since the dispenser was last operated.

*Modified form of mechanism for preventing operation of the dispenser after a predetermined number of tickets have been issued*

In Figures 38 to 40 inclusive is shown a mechanism which may be used in lieu of the parts 131 to 145, described in connection with Figures 5, 8 and 9. This mechanism acts to prevent operation of the dispenser after a predetermined number of tickets have been issued. A rearwardly extending lever 177 is pivoted on a screw 178 secured to the left side plate 4. A downwardly extending second lever 179 is also pivoted on the side plate 4 on a screw 180. The lever 177 has secured thereon to the right of the pivot point thereof an inwardly extending stop 181 and the lever 179 has secured thereon a similar stop 182 situated below its pivot point. A spring extends from above the stop 181 under and around the screw 178, over and around the screw 180 and rearwardly of the stop 182. Obviously any suitable means for securing the ends of the spring 183 may be used in lieu of stops 181 and 182. The lever 177 is provided with a transverse roller 184 on the rear end thereof which rides on the outer periphery of the ticket roll 78. As the roll 78 is depleted, the lever 177 will pivot about the screw 178. The upper and forward ends, respectively, of levers 179 and 177 are provided with interengaging surfaces, that of the former being cut off at the rear corner thereof. As the roll 78 diminishes, the surface on the end of lever 177 will ride off the cut-off portion on the end of the lever 179, permitting the spring 183 abutting stop 182 to pivot the lever 179 forwardly against the collar 146. When the collar 146 moves to the right as when the handle 91 is pushed in prior to issuing a ticket and simultaneously locking the rack bar of the pump, or if it happens to be to the right when the lever 179 is actuated, the latter will engage the left side of said collar and prevent the shaft 5 from returning to the left, thus keeping the dispenser locked until a new roll of tickets is placed in the machine.

The operation is as follows:

In initial position the punch index mechanism comprising the gallon index members 47 to 51 inclusive and quart index members 54 to 56 inclusive is in the position shown in Figure 6 with the gallon index member 51 over its corresponding punch 39 and the quart index members 54, 55 and 56 in inoperative positions. In this position the ticket 1 is positioned under the punches so that the first row of gallon spaces have not yet reached the punches. The gear 15 on the pump shaft acts to drive the index mechanism as shown in Figures 21, 13 and 6 through the train of gears 18, 19, 21; shaft 23; gears 31, 32 and 33. The driving of the index mechanism is in accordance with the volume dispensed. The quart index members 54, 55 and 56 are driven directly by the gear 33. When one gallon has been dispensed, one revolution of said quart index members and gear 57 pinned thereto will impart through gears 61, 60 and 53, one-fifth of a revolution to the gallon index members 47, 48, 49, 50 and 51, moving the latter members one-fifth of a revolution which would bring the index member 51 out of operative position above its punch 39 and bring the index member 47 into position above its punch 39 over the left of the ticket. The index members are then positioned from left to right over their respective punches 39 in accordance with the operation of the pump mechanism. The positioning of the index members was more specifically described in connection with the punch index mechanism. Since the ticket step up mechanism steps the ticket and recording strips ahead an initial step of one half a space after three quarts have been dispensed, the index member 47 and the punch 39 therebeneath will by the time one gallon has been dispensed be in position to punch said strips in the upper half of the one gallon space opposite the serial number of the ticket. The Geneva gear and lock 58 and 62 respectively will prevent overrunning of the gallon index members when movement has been imparted thereto by gear 57. It should be noted that whenever one or more complete gallons have been dispensed, the gap between the ends of the quart indexes 54, 55—56 will be over the quart punches so that the same will not be operated when any of the gallon punches are operated to record any number of completed gallons. The ticket and recording strips are fed over the sprockets 64 a second step to bring the upper half of the two gallon space into position under the index member 48 by the time a total of one gallon and three quarts have been dispensed. When a total of five gallons and three quarts have been dispensed, the ticket and recording strips will be given another step to bring the upper half of the six gallon space under the index 47 and so on intermittently bringing the lower rows of spaces on said strips into position under the punches 39 in accordance with the operation of the pump mechanism. The manner in which the pump mechanism effects the intermittent drive of the sprockets 64 for advancing the ticket and recording strips was more specifically described in connection with the ticket step up mechanism.

The auxiliary handle 91 which is adapted to be actuated to punch the ticket, reset the machine to initial position and incidentally sever and issue the ticket as described in connection with the punch actuating, resetting, and ticket severing mechanisms, cannot be rotated to actuate said mechanisms until at least two quarts have been issued because of tooth 115 on the shaft 5 engaging the detent 114$^d$. The detent 114$^d$ is controlled by the cam projection 113 on the plate 112 which as previously described, rotates with the gear 111 in accordance with the operation of the pump mechanism and thereafter with the operation of the auxiliary handle 91 through the operation of the lost motion mechanism. When sufficient liquid has been dispensed and it is desired to punch the ticket, the auxiliary handle 91 is pushed in causing the gear 92 to engage the gear 97. The auxiliary handle 91 may then be rotated causing the shaft 20 and cam 124 thereon to tilt the punch carriage forwardly and downwardly to cause the index members to engage the punches 39 for punching the ticket and record strips. By the time the gear 98 has engaged the gear 102 for driving the shaft 100, the punching will have been completed. This is due to the cut away portion of the teeth of said gear 98. When the shaft 100 has been driven sufficiently as previously described in connection with the resetting mechanism to cause the dog member 104 to drive the gear 108$^b$, the resetting operation will commence. This, as previously described, consists in driving the ticket step up and the index mechanisms forwardly through the remainder of the cycle of operation to initial position. Since the ticket step up mechanism is driven forwardly, the ticket will be automatically issued thereby and when the complete cycle is ended, the cam projection 113 (Figure 16) will again engage the arm 114 for causing the detent 114$^d$ to engage the tooth 115 for stopping the auxiliary handle, and arm 119 will be positioned beneath lug 120 for preventing overthrow of the various mechanisms. Near the completion of the cycle, that is, near the end of one revolution of shaft 20, the lever 130 (Figure 8) thereon, engages beneath one end of the lever 128 to impel the other end of the latter lever downwardly for actuating the cutter 127 to sever the ticket about to be issued. The pump mechanism thus drives the ticket index and ticket step up mechanisms from initial position through any desired portion of the cycle of operations to position the punches over the ticket and record strips, and the auxiliary handle may then be actuated through the remainder of the cycle to punch the ticket and record strips to drive the ticket index and ticket step up mechanisms forwardly to initial position again, and to sever the ticket at the close of said cycle.

The registering mechanism is also driven by the pump mechanism through the gears 15, 18, 19 and 21 (Figure 13) and is accumulative, that is, it is not reset to zero (driven forwardly to the end of the cycle) by the resetting mechanism.

The pawl 25 will drive the ratchet 24 in accordance with the movement of the pump rack 7 in one direction to advance the ticket index, step up, and other mechanisms. The teeth on the ratchet 24 being comparatively long depending upon the maximum and minimum variations in lengths of the strokes, the pawl 25 will ride back over the ratchet 24 on the return stroke of the rack bar so that if said ratchet had been advanced farther than normal, a slight amount due to an unusually long advance stroke, on the next advance stroke, said pawl will not engage with the teeth of said ratchet to again effect the advance of the latter until the former has been advanced an amount equal to said amount of overthrow. Thus the ratchet and pawl nullifies the effect of the variation in stroke on the resultant advance of the mechanisms driven by said ratchet. The converse is true when the pawl 25 advances the ratchet 24 less than normal a slight amount due to the stroke being less than normal. The pawl 148 will drive the ratchet 149 to effect the drive of the gallon register. Since the teeth of the ratchet 149 are also made comparatively long, the pawl 148 and said ratchet will compensate the register drive for the variations in lengths of stroke of the rack back 7 in the same manner as the pawl 25 and the ratchet 24, above, compensate the drive of the various other mechanisms.

In case twenty-five gallons have been issued on one ticket, the cam 122 (Figure 16) will engage with the upwardly extending member 123 and force the auxiliary handle inwardly causing the shaft 6 connected to the shaft 9 to engage the rack bar of the pump, preventing any further dispensation of liquid until the ticket is issued.

It will be apparent that an efficient volume recorder and register is provided.

To facilitate replacing of the ticket and record rolls, the rod 42 may be withdrawn and the brackets 34 and 35 with the carriage 43 thereon may then be pivoted upward and backward about the shaft 20.

It will be obvious to those skilled in the art that the system of checks and cross checks provided above will be of the utmost advantage to the owner and operator of the device and the purchaser of the commodity dispensed from said device. The total of the sales as indicated by a periodic review of the record tickets can be checked by a periodic reading of the register. The record tickets are kept within the machine, the casing of which may be kept locked. The record tickets may only be removed by an authorized person and cannot be tampered with by the operator to defraud the owner. The purchaser is protected against a fraudulently marked ticket given him by the operator as he can see through the display window 169 just how his ticket should be marked. A record is kept of all the tickets so that if the purchaser complains some time after the sale, his ticket can be checked with its duplicate which bears the same serial number. The operator is thus protected against charges of fraud as well as the purchaser, against fraud. An inspector can tell by looking at the aperture 171 whether or not a ticket has been issued in accordance with the last amount dispensed so as to provide a check on whether or not the operator has operated the dispenser without issuing a ticket.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. In a device of the class described, the combination with a dispenser, of a ticket issuing device therefor, a strip of tickets therein, means for locking said dispenser against operation, and means for preventing the release of said locking means when said strip of tickets has been expended.

2. In a device of the class described, the combination with a dispenser, of a ticket issuing device therefor, a strip of tickets therein, means for locking said dispenser against operation, and means for preventing the release of said locking means when said strip of tickets has been expended, said preventing means comprising a cam member, means for driving said cam member in accordance with the number of tickets issued, a lever adapted to be actuated by said cam member, said lever being adapted when actuated by said cam member for engaging said locking means.

3. In a device of the class described the combination with a dispenser, of a volume indicating device adapted to be indexed thereby, and means for automatically locking said dispenser when said indicating device has reached a predetermined amount, said means comprising a rotatable member adapted to be driven by said dispenser, a cam on said rotatable member, a locking member adapted to be initiated by said cam when said rotatable member has been driven a predetermined amount.

4. In a device of the class described, a ticket issuing device having a ticket roll therein, a dispenser, means engaging said ticket roll for preventing the operation of said dispenser after said ticket issuing device has been actuated a predetermined number of times.

5. In a device of the class described, a ticket issuing device having a ticket roll therein, a dispenser, means engaging said ticket roll for preventing the operation of said dispenser after said ticket issuing device has been actuated a predetermined number of times, said means comprising a pivoted lever engaging the outer surface of said roll, and a locking lever adapted to be released by said first lever when the latter has been actuated a predetermined amount.

6. The combination with a dispensing machine and a recording mechanism therefor including a recording strip and marking means therefor adapted to be indexed across said strip in accordance with the quantity dispensed, of a feed wheel for advancing said strip in accordance with said quantity dispensed, means for rotating said wheel a portion of a predetermined amount in accordance with said quantity dispensed, and auxiliary means for rotating said wheel for the remainder of said predetermined amount for marking and advancing said strip.

7. In a device of the class described the combination with a dispenser, of a volume indicating device adapted to be indexed thereby, and means for automatically locking said dispenser when said indicating device has reached a predetermined amount, said means comprising a rotatable member adapted to be driven by said dispenser, initiating means on said rotatable member, and a locking member adapted to be initiated by said initiating means when said rotatable member has been driven a predetermined amount.

8. In a liquid dispenser, the combination with pumping mechanism, of a locking mechanism and coacting members between said pumping mechanism and locking mechanism for automatically moving said locking mechanism into engagement with a part of said pumping mechanism after a predetermined volume has been dispensed.

9. In a liquid dispenser, a ticket tape, pin wheels for advancing the same, mechanism for intermittently operating said pin wheels at short and long intervals, recording members located over said tape, operating devices for said recording members, means for intermittently bringing one or more of said devices in registry with certain of said recording members and means for effecting engagement of said registering devices and recording members for the purposes set forth.

10. In a liquid dispenser, a ticket tape, pin wheels for advancing the same, means for intermittently operating said pin wheels, a series of recording members over said tape, operating devices for said recording members, means for intermittently bringing one or more of said devices in registry with certain recording members and means for effecting engagement of said registering devices and recording members for making a record upon said tape.

11. In a liquid dispenser, comprising operating mechanism, the combination with recording mechanism comprising record strips and marking means set by said operating mechanism, of a manually actuatable shaft normally locked against rotation, means for shifting said shaft for simultaneously unlocking the same and locking said operating mechanism and driving connections between said shaft and recording mechanism for marking said strips and advancing the same.

12. In a liquid dispenser comprising operating mechanism and recording mechanism connected with said operating mechanism, a manually rotatable member normally locked against rotation and having a driving relation with said recording mechanism, means for shifting said rotatable member for unlocking the same, and means set in motion by the shifting of said member for locking said operating mechanism.

13. In a liquid dispenser in which a pair of superposed record tapes are synchronously advanced in accordance with the quantity dispensed and in which tape indexing members are set in accordance with the quantity dispensed, a rotatable and shiftable shaft, means normally locking said shaft against rotation, and releasing the same upon shifting movements thereof, means set in motion by the shifting of said shaft for locking said dispenser and operatively connecting said record tapes and indexing members with said shaft.

14. In a liquid dispenser, comprising operating mechanism and recording mechanism set by said operating mechanism, a manually rotatable and shiftable shaft, means normally locking said shaft against rotation and releasing the same upon shifting movement thereof, means set in motion by the shifting of said shaft for locking said operating mechanism and effecting an operative relation between said shaft and recording mechanism.

15. In a liquid dispenser comprising operating mechanism, recording mechanism and ticket issuing mechanism operated by said operating mechanism, a manually operable and shiftable member for locking said operating mechanism and means set in motion by the shifting of said member for operating said recording and ticket issuing mechanism.

16. In a gasoline vending machine, dispensing mechanism, a record tape, indexing mechanism for said tape, driving connections between said dispensing mechanism, record tape and indexing mechanism whereby said tape and mechanism are advanced in accordance with the quantity dispensed, and a normally locked auxiliary mechanism shiftable to unlocking position for driving relation with said indexing mechanism and for locking said dispensing mechanism.

17. In a dispensing machine comprising operating mechanism, web feeding mechanism operated thereby, an indexing mechanism adapted to be indexed transversely of the web by said operating mechanism, and a normally locked auxiliary mechanism movable to unlocking position for operating said indexing mechanism, returning the same to initial position and advancing said web feeding mechanism.

18. In a liquid dispenser, the combination with pumping mechanism, of locking mechanism therefor including a shiftable shaft, an arm in said shaft, and a rotatable member driven by said pumping mechanism for shifting said shaft for locking said pumping mechanism after a predetermined quantity of liquid has been dispensed.

19. In a liquid dispenser, the combination with pumping mechanism, of a rotatable member driven thereby, and locking means for said pumping mechanism operated by said rotatable member after a predetermined quantity has been dispensed.

20. In a liquid dispenser, a ticket tape, pin wheels for advancing the same, mechanism for intermittently operating said pin wheels at different intervals, recording members for said tape, operating devices for said recording members, means for intermittently bringing one or more of said devices in registry with said recording members and means for effecting engagement of said registering devices and recording members for the purpose set forth.

In testimony whereof I have hereunto subscribed my name.

GEORGE C. LEPPLA.